(12) United States Patent
Tanrikulu

(10) Patent No.: US 7,020,272 B2
(45) Date of Patent: Mar. 28, 2006

(54) HIGH DENSITY SIGNAL CLASSIFIER FOR MEDIA GATEWAYS

(75) Inventor: Oğuz Tanrikulu, Wellesley, MA (US)

(73) Assignee: Tellabs Operations, Inc., Naperville, IL (US)

( * ) Notice: Subject to any disclaimer, the term of this patent is extended or adjusted under 35 U.S.C. 154(b) by 474 days.

(21) Appl. No.: 09/812,057

(22) Filed: Mar. 19, 2001

(65) Prior Publication Data

US 2002/0080951 A1 Jun. 27, 2002

Related U.S. Application Data

(63) Continuation-in-part of application No. 09/696,730, filed on Oct. 25, 2000.

(51) Int. Cl.
  *H04M 1/00* (2006.01)
(52) U.S. Cl. ..................... 379/386; 379/283; 379/93.28
(58) Field of Classification Search ................ 379/386, 379/372, 283, 351, 93.28
  See application file for complete search history.

(56) References Cited

U.S. PATENT DOCUMENTS

| | | | |
|---|---|---|---|
| 5,119,322 A | | 6/1992 | Stroobach |
| 5,353,346 A | | 10/1994 | Cox et al. |
| 5,392,348 A | | 2/1995 | Park et al. |
| 5,428,680 A | * | 6/1995 | Murata et al. ............... 379/386 |
| 5,619,564 A | | 4/1997 | Canniff et al. |

OTHER PUBLICATIONS

Mitra, S.K. and Hirano, K., "Digital All-Pass Networks," *IEEE Trans. Circuits Systs.*, CAS-21(5): 688-700 (1974).

Tanrikulu, O. and Kalkan, M., "Design and Discrete Re-optimization of All-pass Based Power Symmetric IIR Filters," *Electronics Letters*, 32(16): 1458-1460 (1996).

Tanrikulu, O., "Adaptive Signal Processing Algorithms with Accelerated Convergence and Noise Immunity," Ph.D. Thesis, Imperial College of Science, Technology and Medicine, University of London (1995).

Valenzuela, R.A and Constantinides, A.G., "Digital Signal Processing Schemes for Efficient Interpolation and Decimation," *IEE Procedings-G, Circuits Devices and Systems*, 130(6): 225-235 (1983).

(Continued)

*Primary Examiner*—Jefferey F. Harold
(74) *Attorney, Agent, or Firm*—Hamilton, Brook, Smith & Reynolds, P.C.

(57) ABSTRACT

A signal classifier decomposes a subject signal into subbands. The signal classifier then analyzes the subbands for a presence of energy and uses detection logic to classify the energy as being representative of a frame of a signal using one of the following protocols: DTMF, MF-R1, ANS (V.25), LEC-DIS, V.21, or AA (i.e., telephone, facsimile, or modem). The detection logic is expandable to detect future protocols. The classifier may employ a preclassifier to select a reduced number of notch filters from among plural notch filters at frequencies which sinusoidal signals composing the energy in the subbands of the protocols may be found. A look-up table having predetermined ranges of data corresponding to the frequencies of the sinusoidal signals may be used to reduce calculation times. By splitting the subject signal into subbands and using efficient filters, the classifier uses an order of magnitude fewer processor instruction cycles than previous classifiers. The classifier is useful in inter-networking devices, such as a media gateway, to facilitate telephony services, such as VoIP.

54 Claims, 19 Drawing Sheets

OTHER PUBLICATIONS

Vaidyanathan, P.P., "Multi-rate Systems and Filter Banks," *Prentice-Hall* (1993).

Tanrikulu, O., et al., "Finite-Precision Design and Implementation of All-Pass Polyphase Networks for Echo Cancellation in Sub-Bands," ICASSP-95, Detriot, USA, 4:3039-3042 (May, 1995).

Tanrikulu, Oğuz, "High-Density DTMF, MF-R1, MF-R2 Detection," *Media Technologies Group*, pp. 1-8.

* cited by examiner

HIGH DENSITY SIGNAL CLASSIFIER FOR MEDIA GATEWAYS

RELATED APPLICATION

This application is a continuation-in-part of co-pending patent application Ser. No. 09/696,730, by Tanrikulu, et al., filed Oct. 25, 2000, entitled "Method and Apparatus for Performing High-Density DTMF, MF-R1, MF-R2 Detection", the entire teachings of which are incorporated herein by reference.

BACKGROUND OF THE INVENTION

Today's telephony networks are being employed to support many different communication devices using many different communication protocols. A typical office, for example, is equipped with electronic communication equipment, such as touch tone telephones, facsimile machines, and modems for Internet communications. The office communication equipment communicates with a device at a central office, for example, which, in turn, facilitates communications between the office communication equipment and a node located elsewhere on a POTS (Plain Old Telephone System) network, the Internet, or other electronic network. Service providers maintain, upgrade, and profit from the communication services provided by the central office communication equipment.

Service providers are limited in the amount of space available where the equipment is located, which is typically a central office. Increasing the number of voice line channels capable of being supported by a media gateway is important to service providers because service providers generate revenue as a function of the number of voice channels that can be supported by their equipment.

A device at the central office that is used to provide communication services for the office communication equipment is known as the media gateway. Among several services provided, the media gateway connects the office communication equipment on the POTS network to another network, such as the Internet.

Another service provided by the media gateway is encoding voice signals into voice-over-IP (VOIP) packets, where IP means Internet Protocol. Yet another service provided by the media gateway is detection of the several communication protocols used by the office communication equipment.

A digital signal processor is a device in the media gateway that processes communication signals carried by the voice channels. Digital Signal Processors (DSP's) are sophisticated computer chips that efficiently execute many low-level mathematical processing functions. For instance, addition and multiplication functions are executed in parallel to perform both functions in one clock cycle, thereby increasing the processing speed (i.e., throughput) of voice channel communication signals. By increasing the processing speed, many voice channels can be serviced by a single DSP and, therefore, less physical space is occupied by equipment capable of supporting more channels.

The DSP is also capable of executing high-level functions, such as signal classification, in which a signal classifier distinguishes communication protocols from one another. The classifier detects sinusoidal signals (sinusoids) composing the several communication protocols during the dialing portion of the communication protocols. For example, the dual-tone of dialed digits from a touch tone telephone (i.e., DTMF—Dual Tone Multiple Frequency) have sinusoids of different frequencies from those of other protocols (e.g., MF-R1—Multiple Frequency, One Row, a digital protocol used between digital networking devices).

Classifiers are traditionally processing intensive, time consuming techniques when executed in software on a signal processor, using several (e.g., five) MIPS (Million Instructions Per Second) or more to classify signals. Since DSP's are generally only capable of two hundred MIPS, the DSP's can only support a few classifiers since many more functions and general overhead processes are required to be done by the DSP. Thus, the media gateways must employ many DSP's to support the high numbers of customers using digital telephony equipment. The number of customers are expected to increase as other telephony services, such as VOIP, become more widely used.

SUMMARY OF THE INVENTION

The number of channels a media gateway can service is a function of the processing performance and memory requirements of a process employed to distinguish a given communication protocol from among several communication protocols. The processing requirements to distinguish the several communication protocols have traditionally been high. Since the number of processors in media gateways is limited, the number of media gateways required to service customers is many. The problem is that, while service providers use media gateways as revenue producing devices, the service providers have limited space in locations, such as central offices, in which to house the media gateways. Therefore, it is advantageous to minimize the amount of processing used to distinguish the several communication protocols.

A classifier using the principles of the present invention uses less processing than existing classification methods by about an order of magnitude to distinguish a given communication protocol from among several communication protocols, which ultimately reduces the number of media gateways necessary to support the same number of customers.

According to the principles of the present invention, the classifier decomposes a subject signal into subbands. The classifier then determines a presence of energy in the respective subbands, where the energy corresponds to at least one sinusoidal signal (sinusoid) in the subject signal. The classifier then filters the at least one sinusoidal signal to classify the signal as using a particular communication protocol.

In one embodiment, the classifier decomposes the subject signal into subbands by employing power symmetric, infinite impulse response (PS-IIR) filters. A preclassifier may be employed to estimate a frequency of a given sinusoid. Estimating the frequency of the given sinusoid may include modeling the given sinusoid by solving a second-order, auto-regression equation. Alternatively, estimating the frequency of the given sinusoid may include and be improved by accessing a look-up table having predetermined ranges of data corresponding to the frequency of the given sinusoid. In the look-up table, the ranges of data may be adjusted to account for estimation error due to finite signal length. Prior to estimating the frequency of the given sinusoid, the classifier optionally multiplies the subband with a window function, such as an N-point triangular window.

The classifier classifies (i.e., identifies) the signal as being one of the following signal types: DTMF, MF, ANS (V.25), LEC_DIS, V.21, or AA, for example. When determining a presence of energy in the respective subbands, the classifier narrows possibilities as a function of the presence, or absence, of energy in the respective subbands. The classifier may instantiate notch filters at select frequencies estimated to be frequencies of sinusoids in the signal to further narrow classification possibilities.

The classifier decomposes the subject signal to significantly reduce the bandwidth of the subbands compared to the subject signal. In one embodiment, the classifier processes the subject signal in frames having a predetermined frame size. One such frame size has been determined to be 10 milliseconds in length for sufficient estimation accuracy.

Before reporting the subject signal-type, the classifier may require multiple (e.g., three) consecutive classifications identifying the same signal-type. After achieving the threshold of consecutive classifications, the classifier reports the communication signal as being a facsimile, modem, voice, or DTMF signal.

By splitting the subject signal into subbands, thereby reducing the bandwidth of the subject signal into lower-bandwidth subbands, and through the use of efficient filters such as PS-IIR filters, the classifier uses an order of magnitude fewer digital signal processor (DSP) instruction cycles (e.g., resulting in less than 0.5 MIPS) below traditional classifiers. In this way, many classifiers and dialed-digit detectors may be disposed on a single digital processor to support many telephony voice channels. The classifier herein described is useful in inter-networking devices, such as a media gateway, to facilitate many telephony services, such as VOIP.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
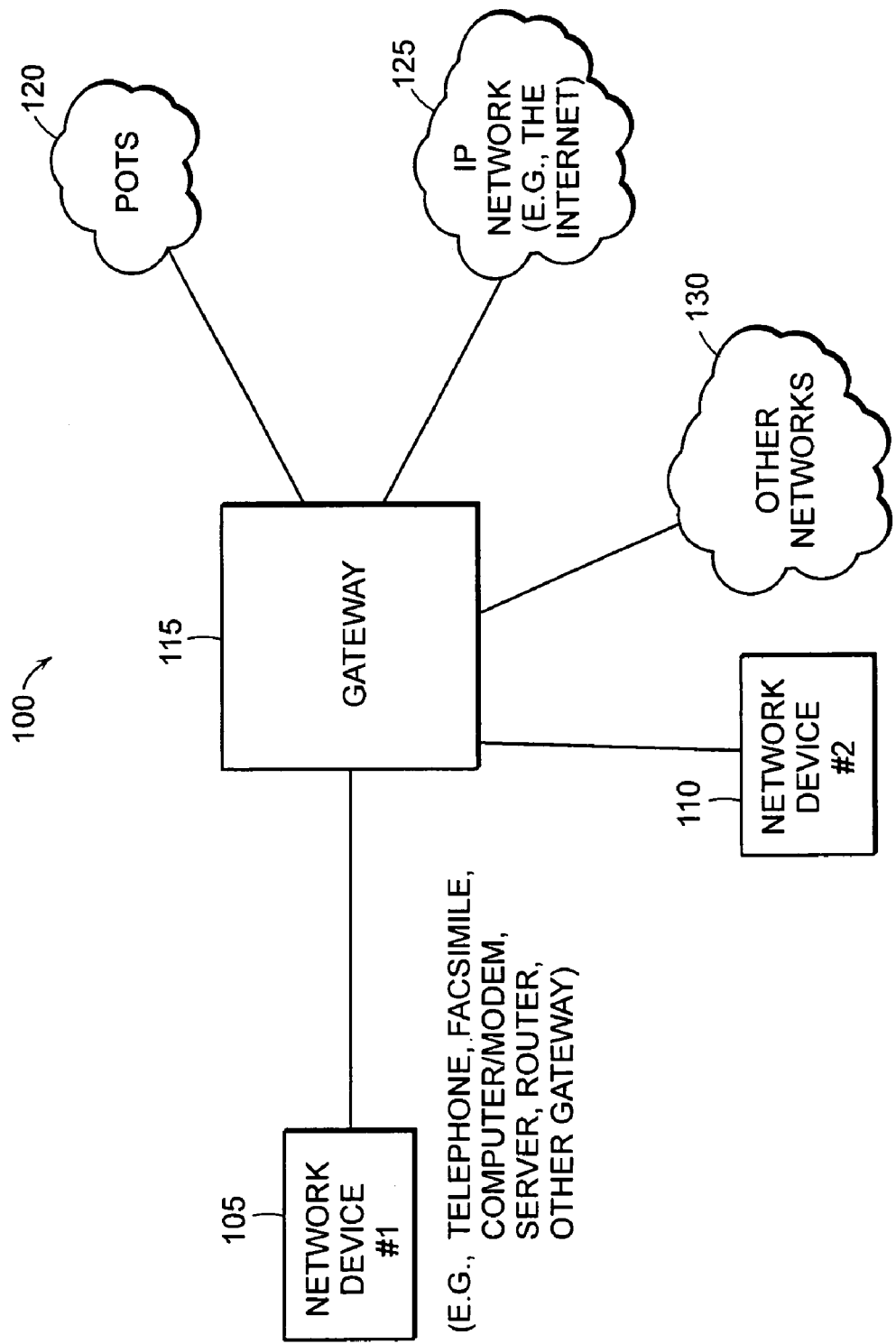
FIG. 1 is a block diagram of a network having a media gateway in which the present invention signal classifier may be deployed.

FIG. 1 is a block diagram of an example network 100 in which an embodiment of the present invention may be deployed. The network 100 includes a first network device 105 and a second network device 110. The first and second network devices 105, 110 may be telephones, facsimile machines, computers with modems, servers, routers, gateways, other network devices or combinations thereof. The first and second network devices 105, 110 are coupled to a gateway 115 in a manner facilitating electronic communications. The communications are conducted via wire, wireless, or fiber optic communication media/protocols.

The gateway 115 is coupled to and provides communication with network devices in other networks. As shown, the gateway 115 is coupled to a Plain Old Telephone System (POTS) network 120, Internet Protocol (IP) network (e.g., the Internet) 125, and other networks 130.

The gateway 115 provides mechanisms for communications between networks of different protocols. For example, the first network device 105 is able to communicate with a network device on the POTS network 120 via the gateway 115.

Figure 2:
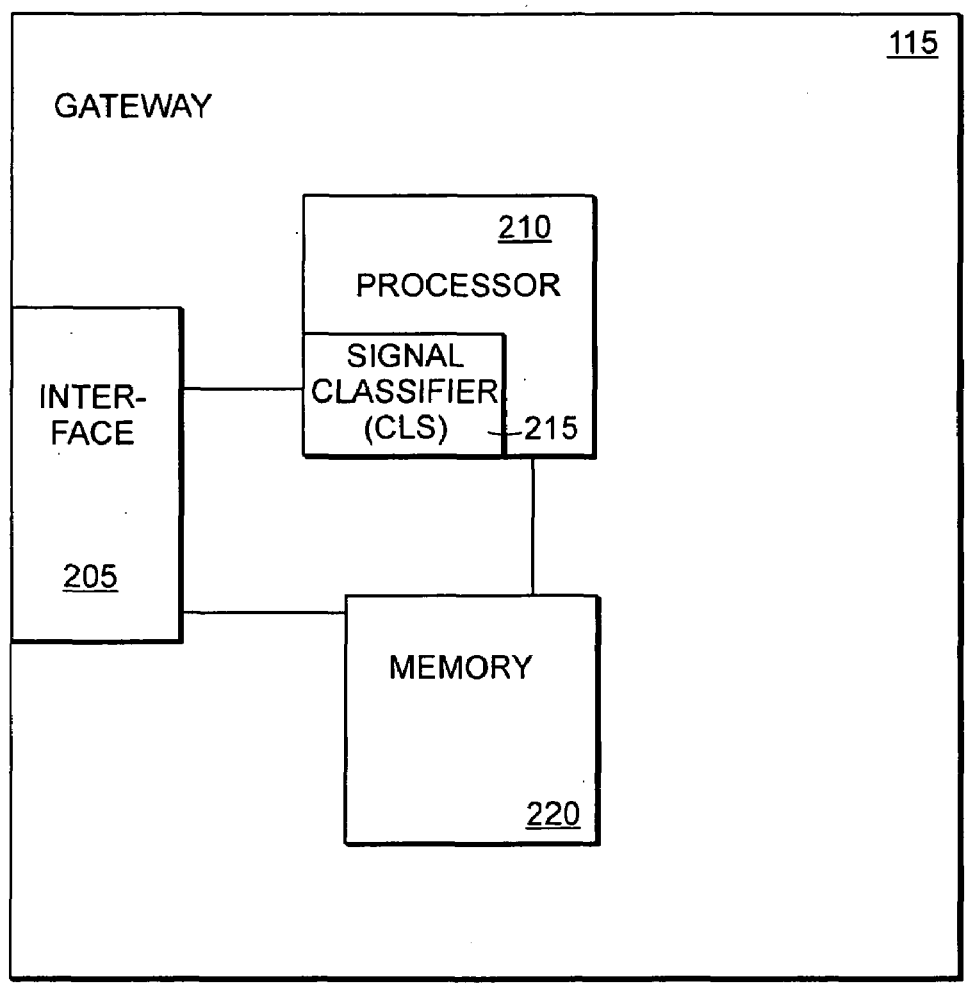
FIG. 2 is a block diagram of the media gateway of FIG. 1.

FIG. 2 is a block diagram of a subset of components in the gateway 115. The components include an interface 205, processor 210, and memory 220. The gateway 115 may include many components 205, 210, 220 to support parallel or distributed processing to support many users at a time.

Inside the processor 210 is a representation of a signal classifier 215. In the preferred embodiment, the signal classifier 215 is software executing on the processor 210. The signal classifier (CLS) unit 215 has the task of detecting several tonal signals that arise in telephony. The classifier 215 offers a framework where several signal detection tasks, such as DTMF, MF-R1, ANS, AA, V.21 and Line Echo Canceller Disable (LEC_DIS), are addressed. This framework is general enough to be expanded to other detection tasks and other tones as specified in the future. As it stands, the classifier 215 is designed for media gateways; however, it can be configured to detect only one or a subset of the features listed above and used for other applications as well. The classifier 215 first tests each signal type individually according to the individual communication protocol standards or recommendations. Furthermore, the same process is repeated where multiple detectors are enabled.

The design philosophy targets maximum density independent of the platform of implementation. Minimum instruction cycles and memory usage is achieved through Digital Signal Processing (DSP) techniques described hereinbelow.

The classifier 215, using the DSP techniques according to the principles of the present invention, reduces the millions of instructions per second (MIPS) consumed by DSP's in classifying signals in two ways. First, the classifier 215 improves the processing of a subject communication signal. Second, the classifier 215 improves the filtering structures used to process the subject communication signal. By approaching the problem of classifying the subject communication signal in terms of processing techniques and processing tools, the MIPS used to classify a given communication signal are reduced an order of magnitude over traditional methods (e.g, from 5 MIPS to 0.5 MIPS). This processing reduction translates into more channels per DSP, which ultimately results in a reduction of cost per channel for the service provider.

In terms of signal processing, the classifier 215 processing the communication signal takes a two-fold approach at reducing the complexity of the processing. First, the communication signal is decimated to 4 KHz and then split into subbands, which reduces the bandwidth requirements for the classifier 215 from 8 kHz to 2 kHz. Second, rather than solving trigonometric equations, the classifier 215 may use pre-calculated possible solutions in an accessible database since DSP's execute look-up statements in fewer instruction cycles than trigonometry statements (e.g., arctangent). In such an embodiment, the classifier 215 may employ a Preclassifier (discussed later in detail in reference to FIG. 7) to execute the processing and look-up statements. Thus, the classifier's approach to signal processing saves several factors of MIPS by this two-fold approach at reducing the complexity of the processing.

In terms of filtering structures, the classifier 215 also uses a two-fold approach. First, the classifier 215 preferably employs power symmetric, infinite impulse response (PS-IIR) filters where possible. For example, PS-IIR filters are used to perform the band-splitting of the communication signal. Because PS-IIR filters have reduced complexity and increased efficiency, among other advantages, over finite impulse response (FIR) filters and other forms of IIR filters, the classifier's efficiency is improved.

Second, the classifier 215 optionally employs a preclassifier, which determines a frequency of a sinusoid in a given subband. By knowing the frequency of the sinusoid in the given subband, the classifier 215 can instantiate a notch filter at a select frequency, corresponding to the frequencies of interest, as in DTMF, MF-R1, ANS, AA, etc. The use of a Preclassifier is discussed in co-pending U.S. patent application Ser. No. 09/696,730 filed Oct. 25, 2000, entitled "Method and Apparatus for Performing High-Density DTMF, MF-R1, MF-R2 Detection" by Tanrikulu et al., the teachings of which are incorporated herein by reference in their entirety. So, rather than continuously running notch filters for all possible frequencies of sinusoids, as discussed in one embodiment of Tanrikulu et al., for all communication protocols that the classifier 215 may be called upon to classify, the classifier 215 can instantiate one or two notch filters, as necessary, for the given communication protocol. Therefore, since each notch filter consumes instruction cycles, a reduction from 8 notch filters or more to 2 or 1 notch filters saves MIPS, which are advantageously used by the DSP for other processing, including the running of additional classifiers for servicing other voice channels.

Beyond the reduction in complexity to yield a reduction in instruction cycles and MIPS, the classifier 215 improves robustness of classifying signals in at least four ways. First, windowing the signal for small samples of data improves parameter estimates (i.e., parameters used to determine frequencies of sinusoids) and extends the frequency range of parameter estimates to the full range of possible frequencies of sinusoids. An N-point triangular window provides good experimental results for the worst performing frequencies. Second, estimated correlation values are averaged across frames of data so that variational effects are minimized.

Third, in one embodiment, noise effects expected to be found on voice lines are pre-calculated by using noise modeling algorithms in conjunction with a Monte Carlo simulation, in which noise levels, w(n), and sample sizes, N, are varied. The noise effects are then included in the databases as "biased estimates." Fourth, frame sizes are optimized to reduce anomalies at low and high frequencies. In the communication protocols of interest, thirty milliseconds of frames are typical. To certify a signal classification, multiple consecutive classifications may be used as a threshold, such as three classifications indicating the same protocol, so as not to produce false alarms. When classifying communication protocols of interest, tests have shown that processing a ten millisecond frame size works well, providing better results than processing a five millisecond frame size.

The following detailed description, tables, and figures provide details of the general description of the classifier 215 just presented.

Figure 3:
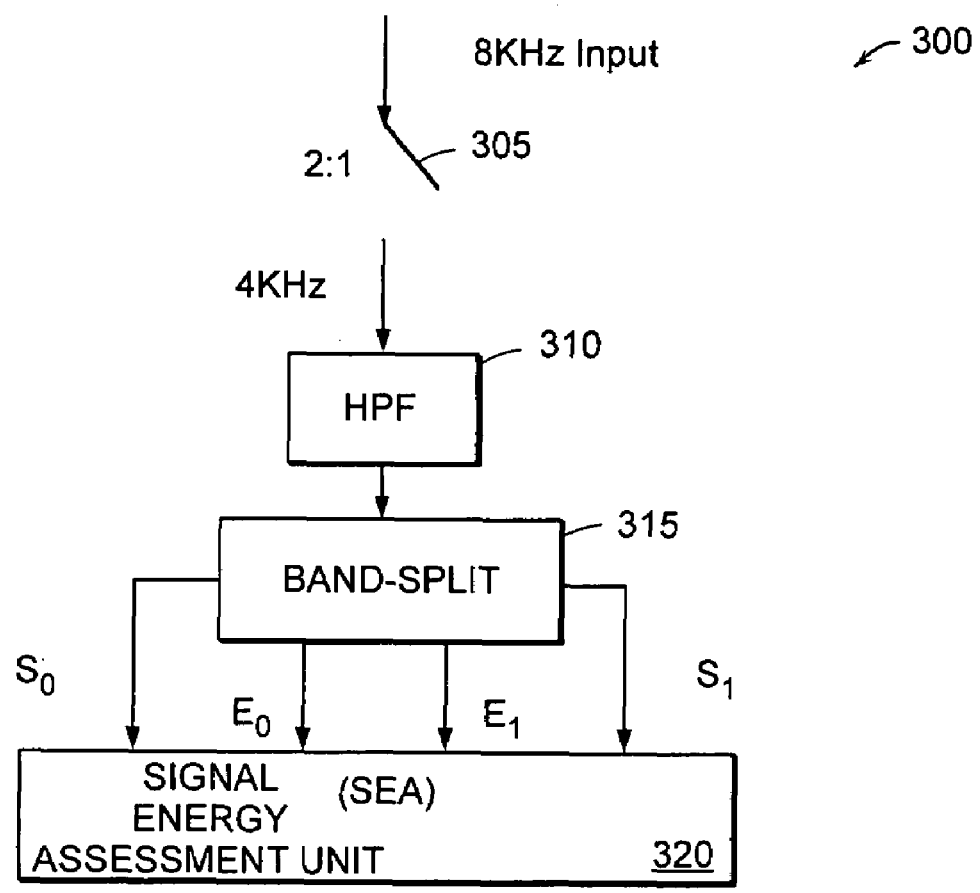
FIG. 3 is a schematic diagram of a front end of the signal classifier of FIG. 2.

FIG. 3 is a schematic diagram of an embodiment of the front-end processing 300 performed in the classifier 215 at any instant in time. The input to the front-end processing 300 is the incoming signal from the line sampled with an A/D (not shown) at 8 KHz. This signal is decimated by a factor of 2:1 by a decimator 305, which alters the sampling rate to 4 KHz. Although this straight decimation operation introduces aliasing, the aliasing is insignificant for detection of tonal signals. Aliasing manifests itself as a change of the frequency of the tone to be detected.

After the decimation, the signal is passed through a High-Pass Filter (HPF) 310 to remove any DC or very low frequency noise signals on the line. In another implementation, the HPF 310 can be applied on the subband zero signal (Sub$_0$) S$_0$, shown in FIG. 3 after a subsequent band-splitter 315. While these alternatives serve the same purpose, there could be small differences in round-off noise in a finite-precision implementation. The HPF 310 has the input-output transfer function $$HPF(z) = \frac{1+\alpha}{2} \frac{1-z^{-1}}{1-\alpha z^{-1}} \qquad (1)$$

where $\alpha < 1.0$.

The high-pass filtered signal is input to the band-splitter 315, which performs a band-split operation. In one embodiment, the band-splitter 315 performs subband decomposition by employing Power-Symmetric IIR (PS-IIR) filters. An embodiment of the band-splitter 315 is shown in detail in FIG. 4.

Figure 4:
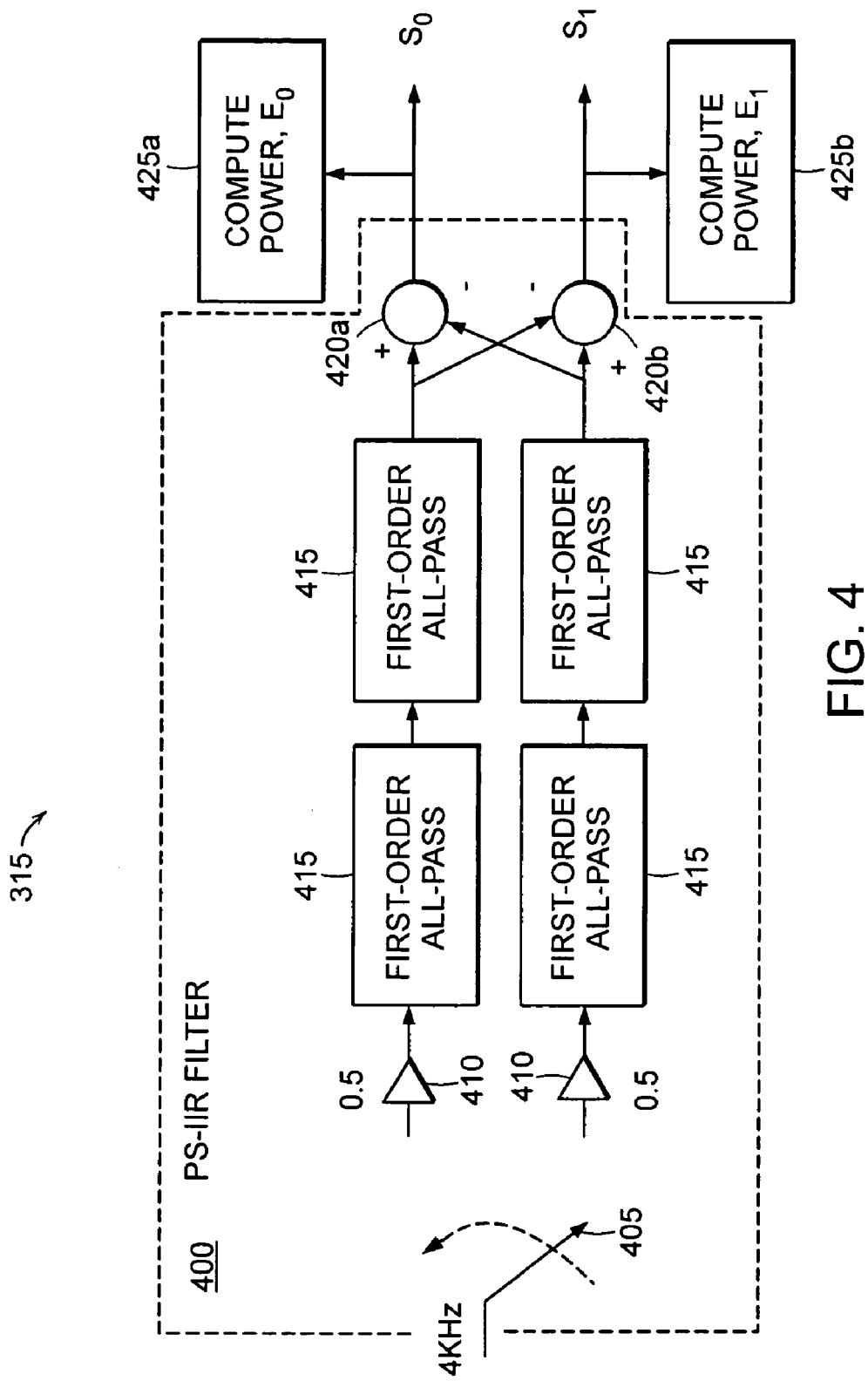
FIG. 4 is a schematic diagram of a band splitter in the front end of FIG. 3.

In FIG. 4, the first-order all-pass sections 415 have the transfer function $$A(z) = \frac{\beta + z^{-1}}{1 + \beta z^{-1}} \qquad (2)$$

These are implemented through the compact realizations of all-pass networks (see S. K. Mitra and K. Hirano, "*Digital All-pass Networks*", IEEE Trans. On Circuits and Systems, vol. CAS-21, no. 5, pp. 688–700. September 1974; R. A. Valenzuela and A. G. Constantinides, "Digital Signal Processing Schemes for Efficient Interpolation and Decimation", IEEE Proc. Vol. 130, no. 6, pp. 225–235, December 1983; and O. Tanrikulu, *Adaptive Algorithms for Accelerated Convergence and Noise Immunity*, PhD. Thesis, Imperial College, London, UK, 1995, the teachings of all are incorporated herein by reference in their entirety) that use a single multiplier and a single delay. The scalings 410 by 0.5 are to keep the signal level at unity. After the two paths are combined by adding (step 420a) and subtracting (step 420b) the outputs of the all-pass sections, the subband signals $Sub_0$ ($S_0$) and $Sub_1$ ($S_1$) have a sampling rate of 2 KHz. Moreover, $Sub_0$ represents a 1 KHz interval containing the 0–1 KHz input of the band-splitter 315. $Sub_1$ represents a 1 KHz interval containing the 1–2 KHz input of the band-splitter 315. Note that, due to the decimation operation of the decimator 405 by a factor of 2:1, the frequencies in $Sub_1$ will appear as their mirror images around 1 KHz.

As a by-product of the subband decomposition operation, power computation units 425a, 425b compute the energies of the subband signals as follows:

$$E_i = \sum_{j=0}^{N-1} S_i^2(j) \quad (3)$$

i.e. the sum of squares of the individual subband signals, where N is the number of samples per subband for every input frame. In this design, the frame size is 10 msec. Therefore, at 2 KHz sampling frequency, each subband has N=20 samples.

Note that in FIG. 4, the present invention takes advantage of the fact that the PS-IIR band-splitter 315 is lossless in that the sum of the output energies of the subband signals is equal to the input energy. Therefore, the total energy of the signal is computed from $E_0$ and $E_1$ by:

$$E_T = E_0 + E_1 \quad (4)$$

Having all the above information, the classifier 215 (FIG. 2) first checks to see if $E_T > \epsilon_T$ where $\epsilon_T$ is the threshold below which the classifier 215 labels the current frame as having no signal in it. When $E_T > \epsilon_T$, the classifier 215 determines if there is signal in both subbands or only in one subband. These are established by comparing the pairs ($E_0$, $E_T$) and ($E_1$, $E_T$). These comparisons are performed by the Signal Energy Assesment (SEA) unit 320 shown in FIG. 3.

Below are tables that indicate how the frequency of each tone of interest is mapped into the subbands, $Sub_0$ and $Sub_1$, when the sampling frequency is brought down to 2 KHz.

TABLE 1

DTMF frequencies in subbands.

| DTMF Frequency (Hz) | $Sub_0$ - (Hz) | $Sub_1$ - (Hz) |
|---|---|---|
| 697 | 697 | — |
| 770 | 770 | — |
| 852 | 852 | — |
| 941 | 941 | — |
| 1209 | — | 791 |
| 1336 | — | 664 |
| 1477 | — | 523 |
| 1633 | — | 367 |

TABLE 2

MF-R1 frequencies in subbands.

| MF-R1 Frequency (Hz) | $Sub_0$ - (Hz) | $Sub_1$ - (Hz) |
|---|---|---|
| 700 | 700 | — |
| 900 | 900 | — |
| 1100 | — | 900 |
| 1300 | — | 700 |
| 1500 | — | 500 |
| 1700 | — | 300 |

TABLE 3

Subband mapping of all other tones.

| | Frequencies for Detection | $Sub_0$ - (Hz) | $Sub_1$ - (Hz) |
|---|---|---|---|
| ANS + LEG_DIS | 2100 | — | 100 +– 15 |
| V.21 | 1650 | — | 350 |
| | 1850 | — | 150 |
| AA | 1800 | — | 200 |

Subband Decomposition

Figure 5:
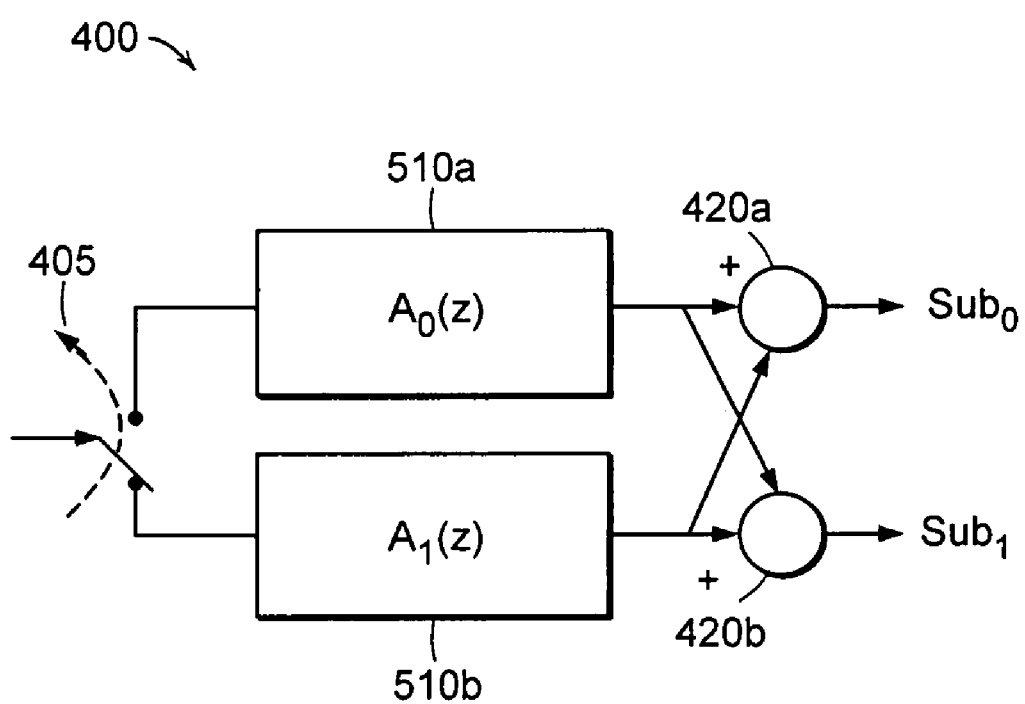
FIG. 5 is a schematic diagram of a polyphase implementation for the band splitter of FIG. 4.

The subband decomposition operation in FIG. 3 is achieved through Power Symmetric IIR (PS-IIR) filters 400 (FIG. 4), as shown in detail in FIG. 5 (see R. A. Valenzuela and A. G. Constantinides, "Digital Signal Processing Schemes for Efficient Interpolation and Decimation", IEEE Proc. Vol. 130, no. 6, pp. 225–235, December 1983; and O. Tanrikulu, *Adaptive Algorithms for Accelerated Convergence and Noise Immunity*, PhD. Thesis, Imperial College, London, UK, 1995 the teachings of which are incorporated herein by reference in their entirety).

Referring to FIG. 5, these PS-IIR filters 400 are based on the decomposition of a general elliptic IIR filter into a special transfer function representation in terms of all-pass sections 510a, 510b. For the purposes of this embodiment of the design, the present invention uses the following structure:

$$H_L(z) = \frac{a_{00} + z^{-2}}{1 + a_{00}z^{-2}} \frac{a_{01} + z^{-2}}{1 + a_{01}z^{-2}} + z^{-1} \frac{a_{10} + z^{-2}}{1 + a_{10}z^{-2}} \frac{a_{11} + z^{-2}}{1 + a_{11}z^{-2}} \quad (5)$$

where $a_{00}$, $a_{10}$, $a_{11}$ are all-pass coefficients. These coefficients can be optimized to get a low-pass filter with a cut-off frequency at $\pi/2$ rads. The design techniques are sophisticated and will not be discussed here (see O. Tanrikulu and M. Kalkan, "*Design and Discrete Re-optimization of All-pass Based Power Symmetric IIR Filters*," Electronics Letters, vol. 32, no. 16, pp. 1458–1460, 1996, the teachings of which are included herein by reference in its entirety). Note that, once $H_L(z)$ is designed, a mirror image high-pass filter is obtained easily as $$H_H(z) = \frac{a_{00} + z^{-2}}{1 + a_{00}z^{-2}} \frac{a_{01} + z^{-2}}{1 + a_{01}z^{-2}} - z^{-1} \frac{a_{10} + z^{-2}}{1 + a_{10}z^{-2}} \frac{a_{11} + z^{-2}}{1 + a_{11}z^{-2}} \quad (6)$$

Finally, the polyphase subband decomposition implementation for the band-splitter 315 (FIG. 3) is obtained, as shown in FIG. 5, where:

$$A_0(z) = \frac{a_{00} + z^{-1}}{1 + a_{00}z^{-1}} \frac{a_{01} + z^{-1}}{1 + a_{01}z^{-1}}, A_1(z) = \frac{a_{10} + z^{-1}}{1 + a_{10}z^{-1}} \frac{a_{11} + z^{-1}}{1 + a_{11}z^{-1}} \quad (7)$$

are cascades of first-order all-pass sections 415 (FIG. 4). Note that each of these sections 510a, 510b are implemented by using the compact realizations of all-pass networks, which require only one memory location and one multiplier for each all-pass section 415 as should be understood from the equations above (see S. K. Mitra and K. Hirano, "*Digital All-pass Networks*", IEEE Trans. On Circuits and Systems, vol. CAS-21, no. 5, pp. 688–700, September 1974, the teachings of which are incorporated herein by reference in its entirety).

Using subband decomposition for the detection of the various telephony signals has a number of advantages. The foremost is, of course, the reduction of the sampling frequency to 2 KHz, which reduces the computational complexity of the subsequent detection tasks in each subband. There are a number of other subtle differences compared to the implementations in the prior art. These other subtle differences have to do with the detection performance. For instance, in DTMF detection, the frequencies are grouped as $F_R=\{697, 770, 852, 941\}$, $F_C=\{1209, 1336, 1477, 1633\}$ before subband division, and one frequency from each group defines a valid DTMF tone. Note that the subband decomposition isolates each group. Therefore, the detection problem then becomes searching for a single tone in each subband.

In an implementation where the tone groups are not isolated as above, the validation of the tones is more difficult because of the difficulty associated with using notch filters to validate tones. In such an implementation, each notch filter computes its output signal energy. The ratio of the input energy to the output energy is used to accept or reject a tone. In a subband design, these ratios are going to be large since there is only one tone per subband for a DTMF signal. However, in a typical prior art implementation with no subband decomposition, the above-mentioned ratio is not so large since, if tone $A \in F_R$ is notched, its output energy will contain tone B's $\in F_C$ energy, and vice versa. The problem of this non-subband implementation is that when the twist requirements on the relative energies of tone A and tone B are tested, it is difficult to set thresholds.

Figure 6:
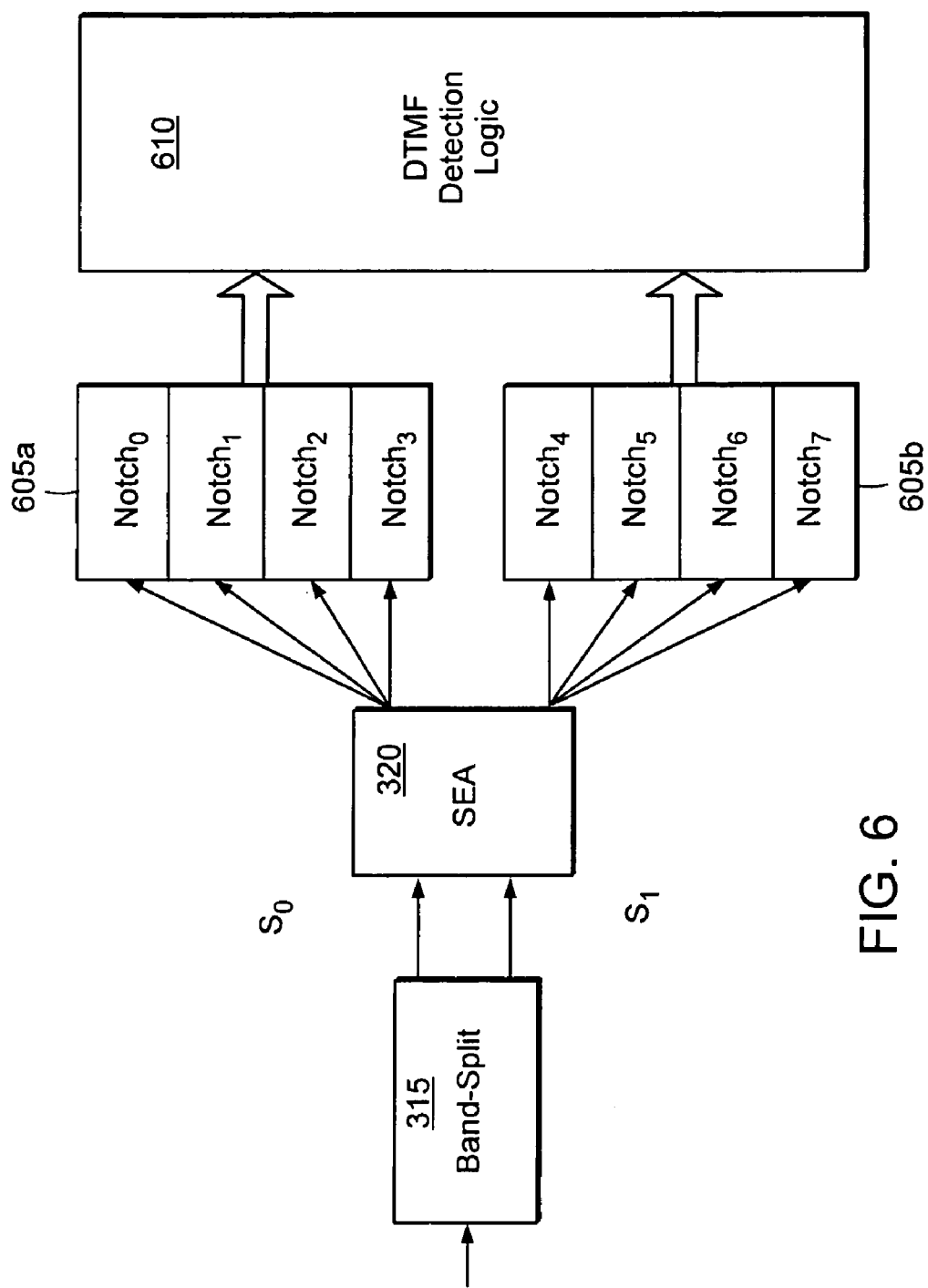
FIG. 6 is a schematic diagram of the signal classifier of FIG. 2 having eight, constantly operating, parallel notch filters.

In a subband implementation according to the principles of the present invention, a primary level solution is to connect a group of four notch filters, 605a, 605b (collectively 605) to each subband signal, such as shown in FIG. 6 and described in co-pending U.S. patent application Ser. No. 09/696,730 al., entitled "Method and Apparatus for Performing High Density DTMF, MF-R1, MF-R2 Detection", incorporated herein by reference in its entirety.

Note that the notch filters have the input/output transfer function:

$$N(z) = r \frac{1 - 2\cos\left(\frac{2\pi f_n}{f_s}\right)z^{-1} + z^{-2}}{1 - 2r\cos\left(\frac{2\pi f_n}{f_s}\right)z^{-1} + r^2 z^{-2}} \quad (8)$$

where r is the pole radius, $f_n$ is the nominal notch frequency, and $f_s$ is the sampling frequency. The filter gain is chosen as r, so that the gain of the notch filter never exceeds unity across the spectrum, which is desirable for a fixed-point implementation, such as on a fixed-point DSP (e.g. Analog Devices® ADSP2111 or Texas Instruments TM5320C50).

Following the notch filtering, the DTMF detection logic 610 is executed to determine whether the signal meets the criteria of a DTMF signal.

The solution in FIG. 6 is still wasteful in the sense that the all eight notch filters 605 are used at all times only to validate a DTMF tone that has only two frequencies in it. Therefore, if a mechanism is available to determine which two notch filters are relevant and which others serve no purpose at every point in time—subject to passing the signal energy assessment (SEA) test, then it is more efficient to run those two relevant notch filters only, rather than all eight. The mechanism to select which notch filters is/are relevant is called a preclassifier, described briefly in co-pending U.S. patent application Ser. No. 09/696,730 filed Oct. 25, 2000, entitled "Method and Apparatus for Performing High-Density DTMF, MF-R1, MF-R2 Detection" by Tanrikulu et al., the teachings of which are incorporated herein by reference in their entirety, and shown and described in detail in FIG. 7.

Preclassifier Design

Although it is possible to identify the frequencies in a signal with multiple sinusoidal frequencies, this is generally computationally too intensive for the application under consideration. The preclassifier performs frequency estimation on a given signal assuming that it is a single sinusoidal. This assumption is logical since DTMF signals map into single sinusoidals in each subband, when there is a valid DTMF signal on the telephone line. If the signal is not a DTMF signal—say speech, the preclassifier returns an inaccurate frequency estimate. However, the notch filter that is assigned by the preclassifier to finally validate the DTMF tone will reject the signal, since the signal will not satisfy the bandwidth or the twist requirements of a DTMF signal.

Figure 7:
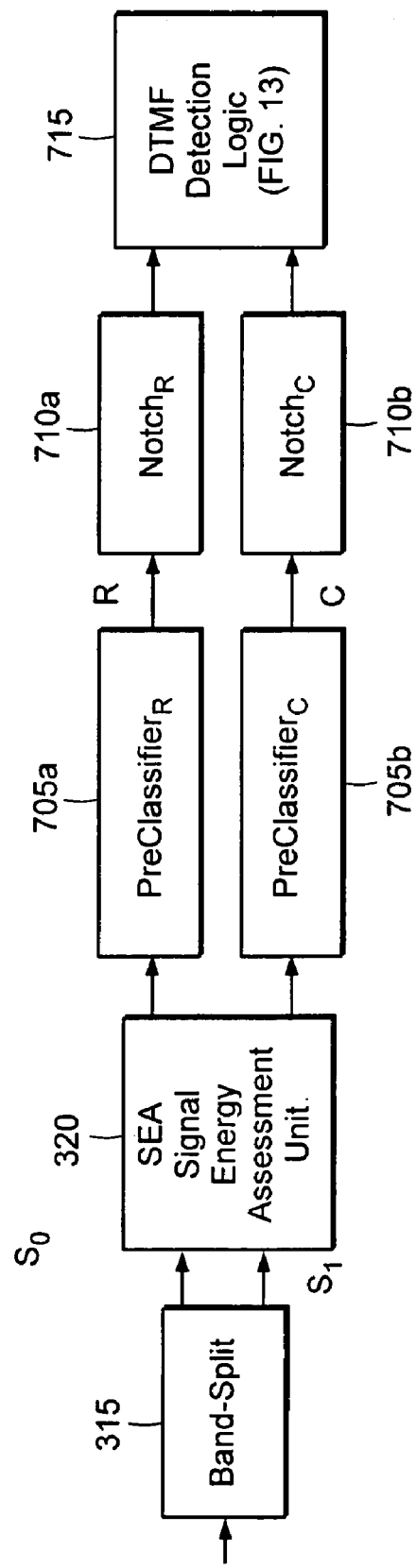
FIG. 7 is a schematic diagram of the signal classifier of FIG. 2 having preclassifiers to reduce the number of notch filters.

FIG. 7 indicates how FIG. 6 is modified with the preclassifiers 705a, 705b to select relevant notch filters from the banks of notch filters 605a, 605b; note that DTMF is again assumed for simplicity.

Following the band-splitter 315 and signal energy assessment (SEA) unit 320, the preclassifiers 705a, 705b performs second order Auto-Regressive AR(2) modeling on $S_i$. The preclassifiers 705a, 705b are designed based on the fact that a narrow-band discrete-time signal can be generated by the difference equation $$y(n) = -a_1 y(n-1) - a_2 y(n-2) + w(n) \quad (9)$$

where w(n) is white noise. By multiplying equation (9) with y(n−i), i=1,2 and taking the expectation, the following AR model equations are derived:

$$\begin{bmatrix} r_0 & r_1 \\ r_1 & r_0 \end{bmatrix} \begin{bmatrix} a_1 \\ a_2 \end{bmatrix} = -\begin{bmatrix} r_1 \\ r_2 \end{bmatrix} \quad (10)$$

where $r_i = E\{y(n)y(n-i)\}$. Therefore, the unknown parameters can be solved directly as:

$$\begin{aligned} a_1 &= d(r_1 r_2 - r_0 r_1) \\ a_2 &= d(r_1^2 - r_0 r_2) \end{aligned}, \text{ where } d = \frac{1}{r_0^2 - r_1^2} \quad (11)$$

is the determinant of the correlation matrix. Once $a_1$ and $a_2$ are solved, the roots of the characteristic polynomial are determined as (assuming the roots are complex, i.e. $4a_2 > a_1^2$):

$$r_{1,2}=0.5(-a_1 \pm j\sqrt{4a_2-a_1^2}) \quad (12)$$

Note that if $4a_2 \leq a_1^2$, then the roots are real, and the frequency is 0 Hz. This condition must be checked.

Finally, the dominant frequency of the narrowband signal can be obtained by using an arctan(.) function on the real and imaginary parts of the roots above. The arctan(.) function is unable to resolve all four quadrants of the unit circle. However, the frequency (in radians) that is being sought can be uniquely determined by using the sign of $a_1$ as:

$$f_c = \begin{cases} \frac{\pi - g(x)}{2\pi} f_s, & a_1 > 0 \\ \frac{g(x)}{2\pi} f_s, & a_1 \leq 0 \end{cases} \quad (6)$$

where $$g(x) = \arctan(\sqrt{x}), \quad x = \frac{4a_2 - a_1^2}{a_1^2} \quad (7)$$

Figure 8:
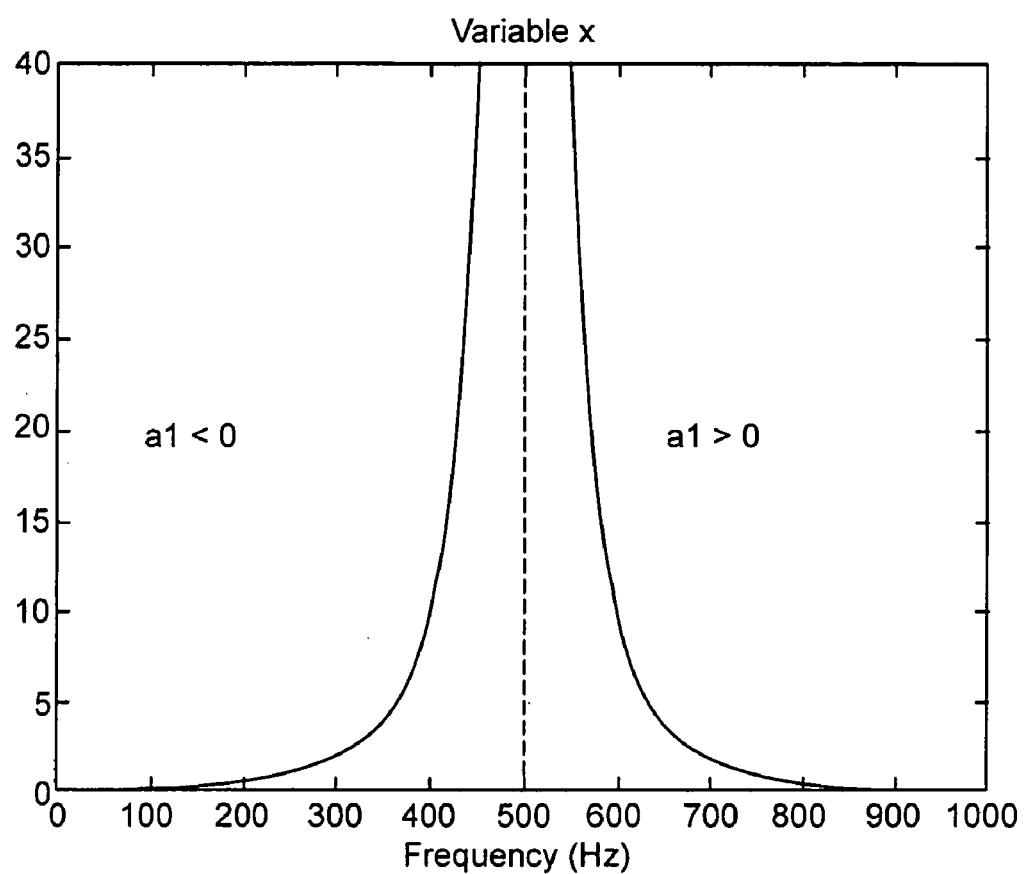
FIG. 8 is a plot used by the classifier of FIG. 7 for classifying signals.

The variation of x with respect to the frequency of the sinusoidal to be estimated is illustrated in FIG. 8.

To summarize the procedure just discussed, first, $r_0$, $r_1$, $r_2$ are computed by averaging. Then, d, $a_1$, $a_2$ are computed from equation (11). Finally, the preclassifier 705a, 705b returns with the value of x. Subsequent detection functions, such as the DTMF, MF-R1, . . . operate on x to determine which candidate frequencies are relevant. In other words, there is no need to evaluate g(x), which costs many instruction cycles on a DSP due to the square-root and arc-tangent functions. Instead, the frequency axis is divided into regions for each subband, and the DTMF frequency that is the closest to a given measurement of x is identified. The presence of a particular frequency is then verified by using a notch filter 710a, 710b (FIG. 7). The decision boundaries between the DTMF frequencies in subbands are given in Table 4.

$$y(n) = \sqrt{2} \cos\left(\frac{2\pi f_c}{f_s} n + \theta\right) + w(n), \quad n = 0, \ldots N-1$$

where $f_c$ is the frequency to be identified, $f_s=2$ KHz is the sampling frequency, $\theta$ is a uniformly distributed random variable in $(-\pi, \pi]$ to simulate the edge effects, w(n) is white, Gaussian noise for different levels of SNR, and N is the length of data available for estimation.

It turns out that windowing the signal before calculating $r_0$, $r_1$, $r_2$ is useful, especially for small N (e.g. N=20 for 10 msec frame size). Therefore, a windowed version of the input signal frame is computed as $$\tilde{y}(n) = y(n) \times h(n) \quad (9)$$

where h(n) is an N-point Triangular window. Among Bartlett, Blackman, Hamming, Hanning, and Traingular windows, the Triangular window provides the best results for the worst performing frequencies.

The correlation coefficients, $r_0$, $r_1$, $r_2$, are estimated over a given frame of data as $$r_0 = \sum_{p=0}^{N-1} \tilde{y}^2(n), \quad r_1 = \sum_{p=0}^{N-2} \tilde{y}(n)\tilde{y}(n+1), \quad r_2 = \sum_{p=0}^{N-3} \tilde{y}(n)\tilde{y}(n+2) \quad (9)$$

Note that it is also important to average the estimated correlation values across frames of data, which can be done by $$r_i'(p) = \alpha r_i'(p-1) + (1-\alpha) r_i, \quad i=0,1,2, \quad 0<\alpha<1.0 \quad (10)$$

and use $r_1'(p)$ to estimate parameter x for a given window.

DTMF logic 715 is employed to determine whether the received signal is a valid DTMF frame. Details of the DTMF logic 715 are discussed later in reference to FIG. 13.

TABLE 4

DTMF frequencies, decision boundaries and their corresponding $\chi$ values.

| Subband0 | | 697 | | 770 | | 852 | | 941 | |
|---|---|---|---|---|---|---|---|---|---|
| Decision Boundaries | 660.5 | | 733.5 | | 811 | | 896.5 | | 985.5 |
| $a_1$ | | >0 | | >0 | | >0 | | >0 | | >0 |
| x | | 3.284 | | 1.231 | | 0.456 | | 0.114 | | 0.002 |
| Subband1 | | 367 | | 523 | | 664 | | 791 | |
| Decision Boundaries | 289 | | 445 | | 593.5 | | 727.5 | | 854.5 |
| $a_1$ | | <0 | | <0 | | >0 | | >0 | | >0 |
| x | | 1.641 | | 32.830 | | 10.929 | | 1.329 | | 0.242 |

Figures 9A, 9B:
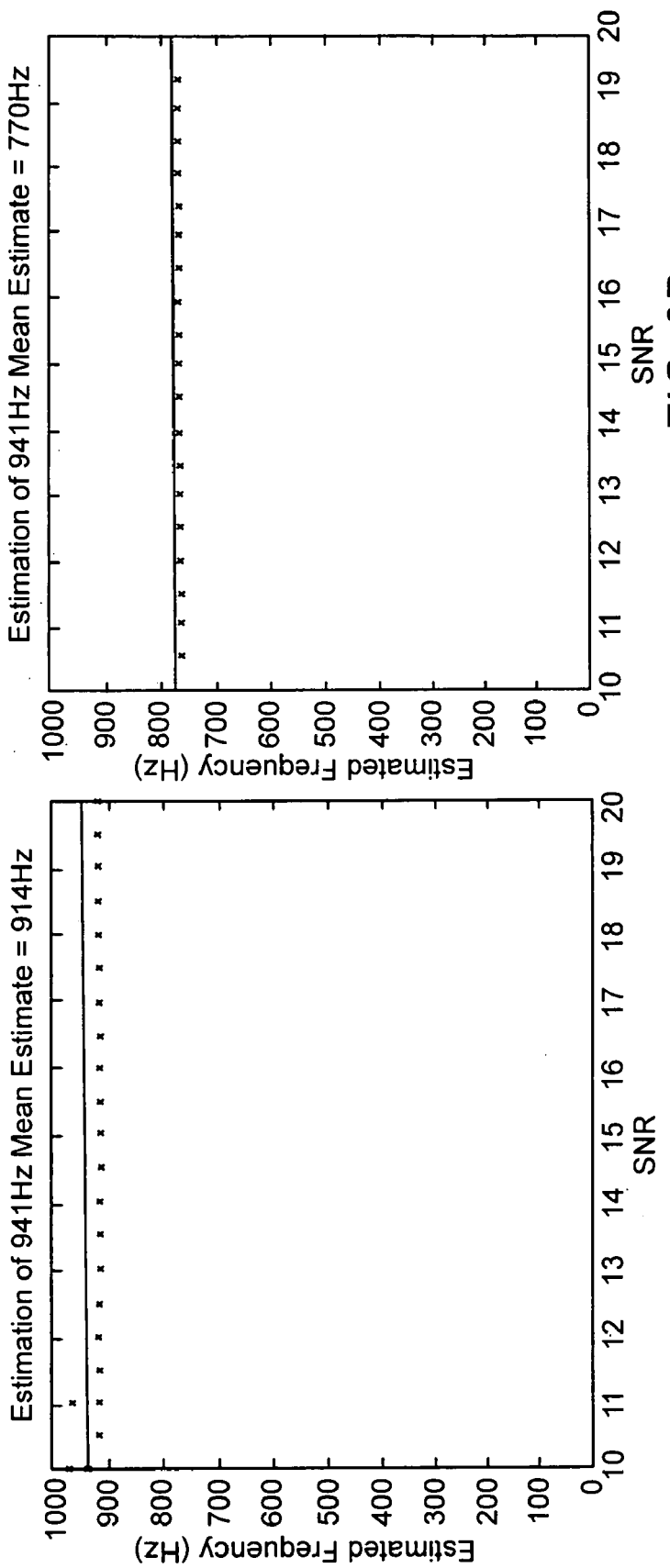
FIG. 9A is a plot of an estimate of a 941 Hz signal of a DTMF signal by the Preclassifier of FIG. 7.
FIG. 9B is a plot of an estimate of a 770 Hz signal of a DTMF signal by the Preclassifier of FIG. 7.

The decision boundaries and the values of x in Table 4 are based on assuming that there are no estimation errors involved in computing $r_0$, $r_1$, $r_2$. However, when these quantities are estimated over very short windows of data, there are problems with the accuracy of the estimation. To understand these estimation errors better, the following signal model can be used FIGS. 9A and 9B are plots of experimental results for DTMF frequencies 941 Hz and 770 Hz for N=20 (10 msec framesize) for twenty Monte Carlo trials.

The windowing and averaging across frames help to keep the estimated frequencies in packed-around clusters. However, it can be seen that the estimated frequencies are biased from the ideal frequencies. This is due to the value of N being too small. When N is increased, experiments confirm that this bias goes to zero. Therefore, the entries in Table 4 are not directly used to classify DTMF frequencies. Instead, new x values are computed based on Monte-Carlo simulations. The nominal frequencies, their biased estimates, the decision boundaries, the sign of $a_1$, and the value of x are tabulated in Tables 5 and 6. Note that, here the decision boundaries are defined as the middle points between the biased estimates.

it is clear that a valid DTMF digit results in energy comparisons in the SEA 320 that point out significant energy in both subbands. If this is not the case, then there is no point in running a DTMF detector. If the SEA 320 determines energy in both subbands, the DTMF detector in (see copending U.S. patent application Ser. No. 09/696,730 filed Oct. 25, 2000, entitled "Method and Apparatus for Performing High-Density DTMF, MF-R1, MF-R2 Detection" by Tanrikulu et al., the teachings of which are incorporated

TABLE 5

Revised preclassifier decision regions for DTMF and their corresponding $\chi$ values, including 1.5% of each DTMF frequency, N = 20 (10 msec frame size).

| Subband0 | Biased Estimates | Decision Boundary | $a_1$ | $\chi$ | Subband1 | Biased Estimates | Decision Boundary | $a_1$ | x |
|---|---|---|---|---|---|---|---|---|---|
| 697 | 694.1512 | | | | 367 | 369.0281 | | | |
| | | 729.5704 | >0 | 1.2936 | | | 445.8795 | <0 | 33.9273 |
| 770 | 764.9896 | | | | 523 | 522.7308 | | | |
| | | 803.8430 | >0 | 0.5016 | | | 592.1336 | >0 | 11.2751 |
| 852 | 842.6965 | | | | 664 | 661.4616 | | | |
| | | 879.4865 | >0 | 0.1582 | | | 723.5534 | >0 | 1.5222 * |
| 941 | 916.2765 | | | | 791 | 785.1352 | | | |

* slightly larger than theoretical value. Used to pass the netcore test.

TABLE 6

PreClassifier decision regions for MF-R1 and their corresponding $\chi$ values, including 1.5% of each MF-R1 frequency, N = 20 (10 msec frame size).

| Subband0 | Biased Estimates | Decision Boundary | $a_1$ | $\chi$ | Subband1 | Biased Estimates | Decision Boundary | $a_1$ | x |
|---|---|---|---|---|---|---|---|---|---|
| 700 | 697.0104 | | | | 300 | 302.9915 | | | |
| | | 793.4531 | >0 | 0.5752 | | | 401.5480 | <0 | 9.7931 |
| 900 | 889.8957 | | | | 500 | 500.1046 | | | |
| | | | | | | | 598.5575 | >0 | 9.7707 |
| | | | | | 700 | 697.0104 | | | |
| | | | | | | | 793.4531 | >0 | 0.5752 |
| | | | | | 900 | 889.8957 | | | |

Figure 10:
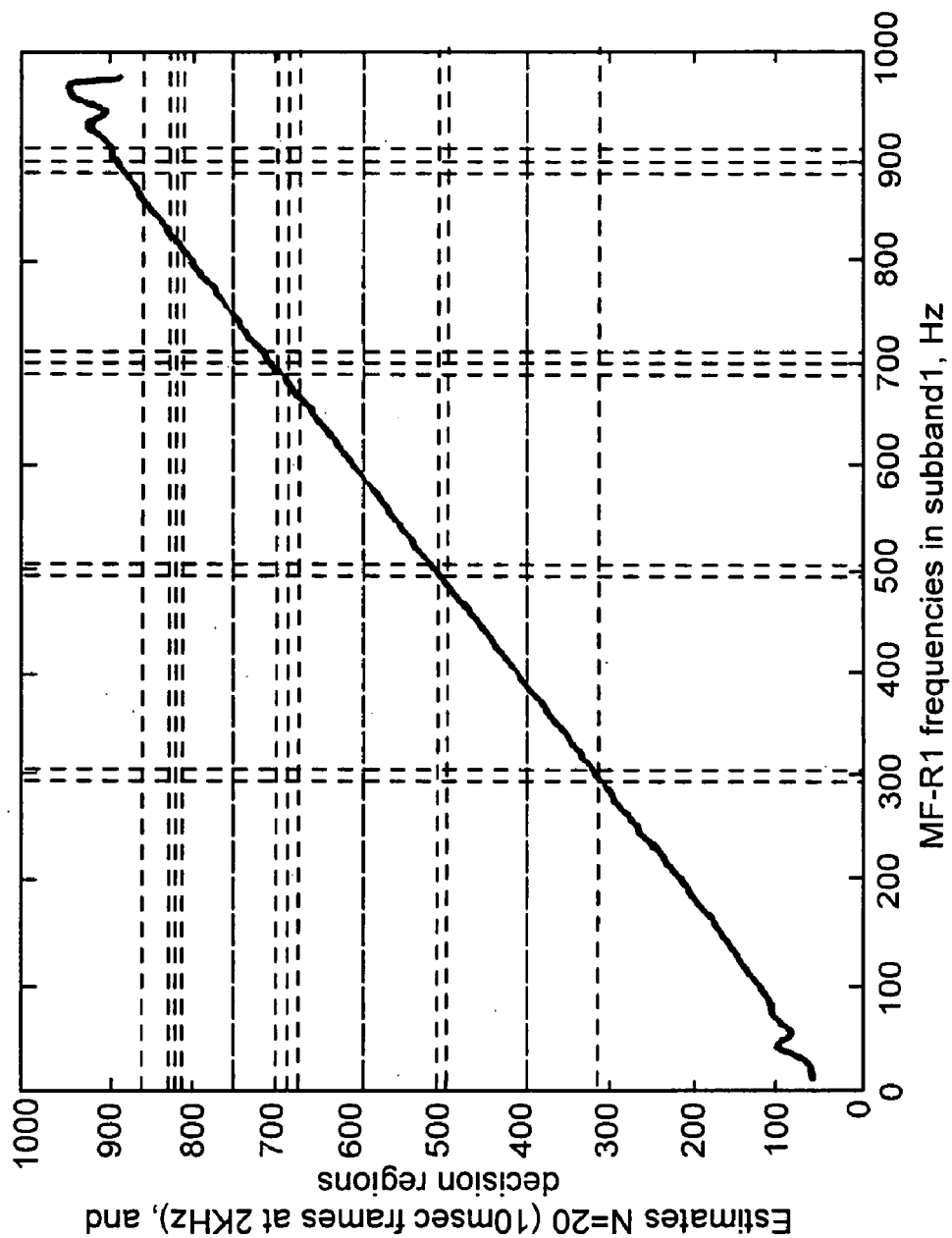
FIG. 10 is a plot of MF-R1 frequencies estimated by the Preclassifier in subband 1 versus decision boundaries for 10 msec frame sizes used by the classifier of FIG. 7 using windowing.

Note that the frequency estimation procedure is repeated for a range of frequencies between 20 Hz and 980 Hz for N=20 (10 msec frame size), and the results are shown in FIG. 10.

Figure 11:
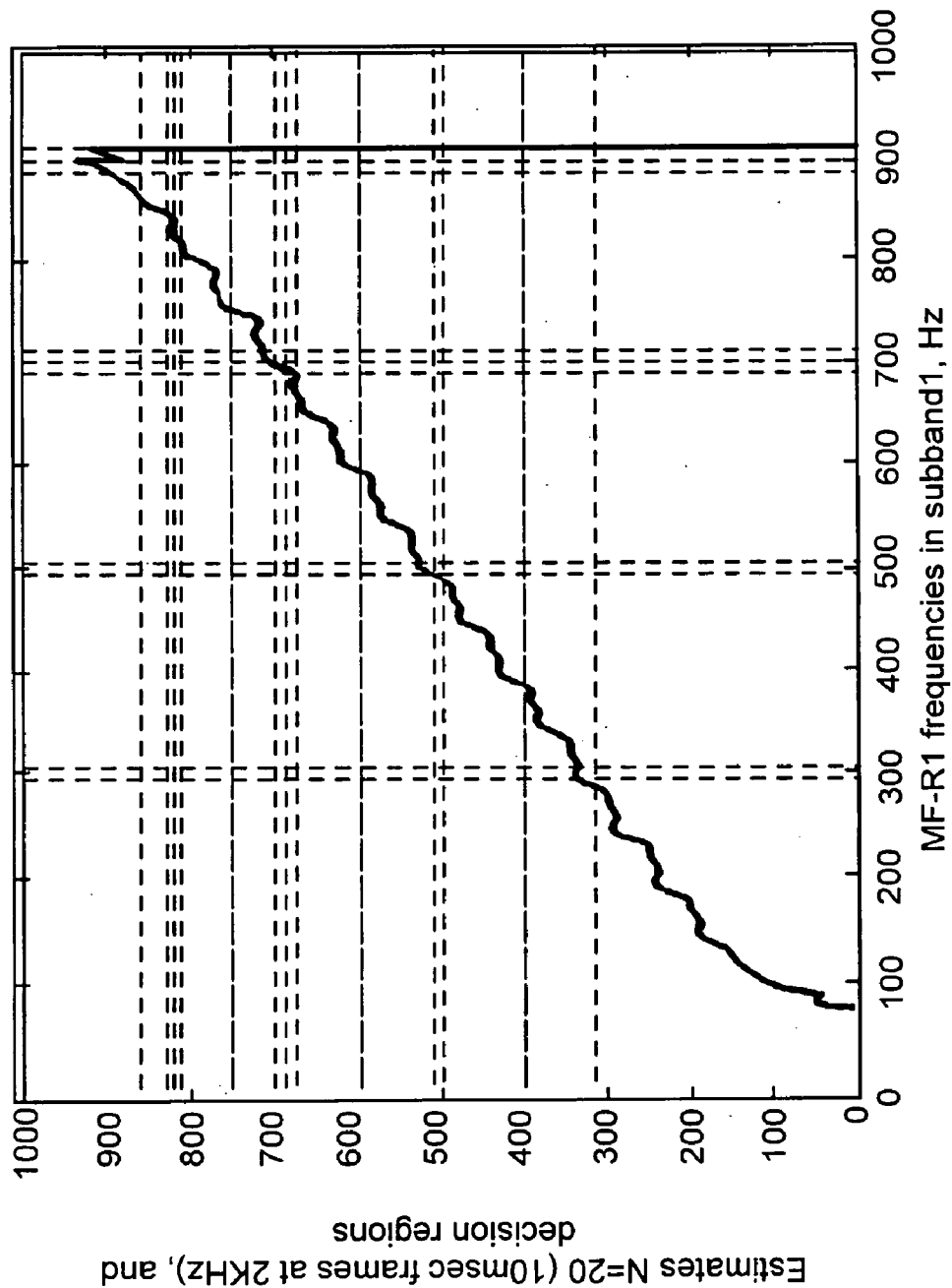
FIG. 11 is the plot of FIG. 10 used by the Preclassifier without windowing.

Finally, since windowing adds to the computational complexity, its effect on detection performance is found to justify its computational complexity by repeating the experiment for FIG. 10. The results in FIG. 11 illustrate quite clearly the necessity to use windowing. Otherwise, there are large errors when the frequencies are above 900 Hz or below 100 Hz.

Main Control Code

At the output of the band split unit 315 in FIG. 3, there is decision logic, referred to as a signal energy assessment (SEA) unit 320, that governs the rest of the operations in the classifier (CLS) 215 (FIG. 2). Different actions are taken based the results of the signal energy assessment (SEA). Recall that one objective is to achieve the minimum computational complexity while still applying to many different tone protocols. The least efficient approach would be to go and check the presence of DTMF, MF-R1, ANS, etc. in a sequential manner. However, there is sufficient amount of a priori information to split this detection task into smaller pieces.

The first piece of a priori information is, of course, the fact that a DTMF digit comprises two tones. From the definition of these tones and the way the signal is split into subbands, herein by reference in their entirety) is called and used with only two notch filters—one per subband—to validate the tones.

The second piece of a priori information is for the MF-R1 detection. In this detection, the subband division splits the frequencies into the groups of $F_R=\{700, 900\}$ in subband 0, and $F_R=\{300, 500, 700, 900\}$ in subband1. Clearly, if the SEA 320 detects signal energy in Subband 0 only, there is no point in using the preclassifier 705a (FIG. 7) since the candidate frequencies are 700 Hz and 900 Hz, and these can be verified by using notch filters. If there is a signal in both subbands, then two preclassifiers 705a, 705b are necessary to determine the relevant notch filters. If there is signal in only Subband 1, what the preclassifier 705b returns is not directly useful for MF-R1 detection, but for other purposes, as described later.

The third piece of a priori information is that all other detection tasks, ANS, V.21, AA, LEC_DIS are handled in Subband 1 according to Table 1. When processing the signals in Subband 1, the preclassifier 705a is used to differentiate between the possibilities of having MF-R1 tones, {V.21, AA} tones, or {ANS, LEC_DIS} tones, depending on the value of x returned by the preclassifier 705b. A value of x=0.204 corresponding to 135 Hz marks the boundary between {ANS, LEC_DIS} and {V.21, AA}. Similarly, a value of x=5.8284 corresponds to 375 Hz. This marks the boundary between MF-R1 tones in Subband 1 and {V.21, AA}. From Table 2 and Table 3, it appears that the 375 Hz boundary has a contradiction in that the 1700 Hz MF-R1 tone, which maps to 300 Hz, and the 1650 Hz part of the V.21, which maps to 350 Hz, cannot be separated. This is not an issue since, when there is a valid MF-R1 signal in Subband 1, it will consist of two tones, and, therefore, the preclassifier 705 will identify a frequency that is much higher than 300 Hz—in fact, around 400 Hz, which is the center of gravity of 300 Hz and 500 Hz.

Figure 12:
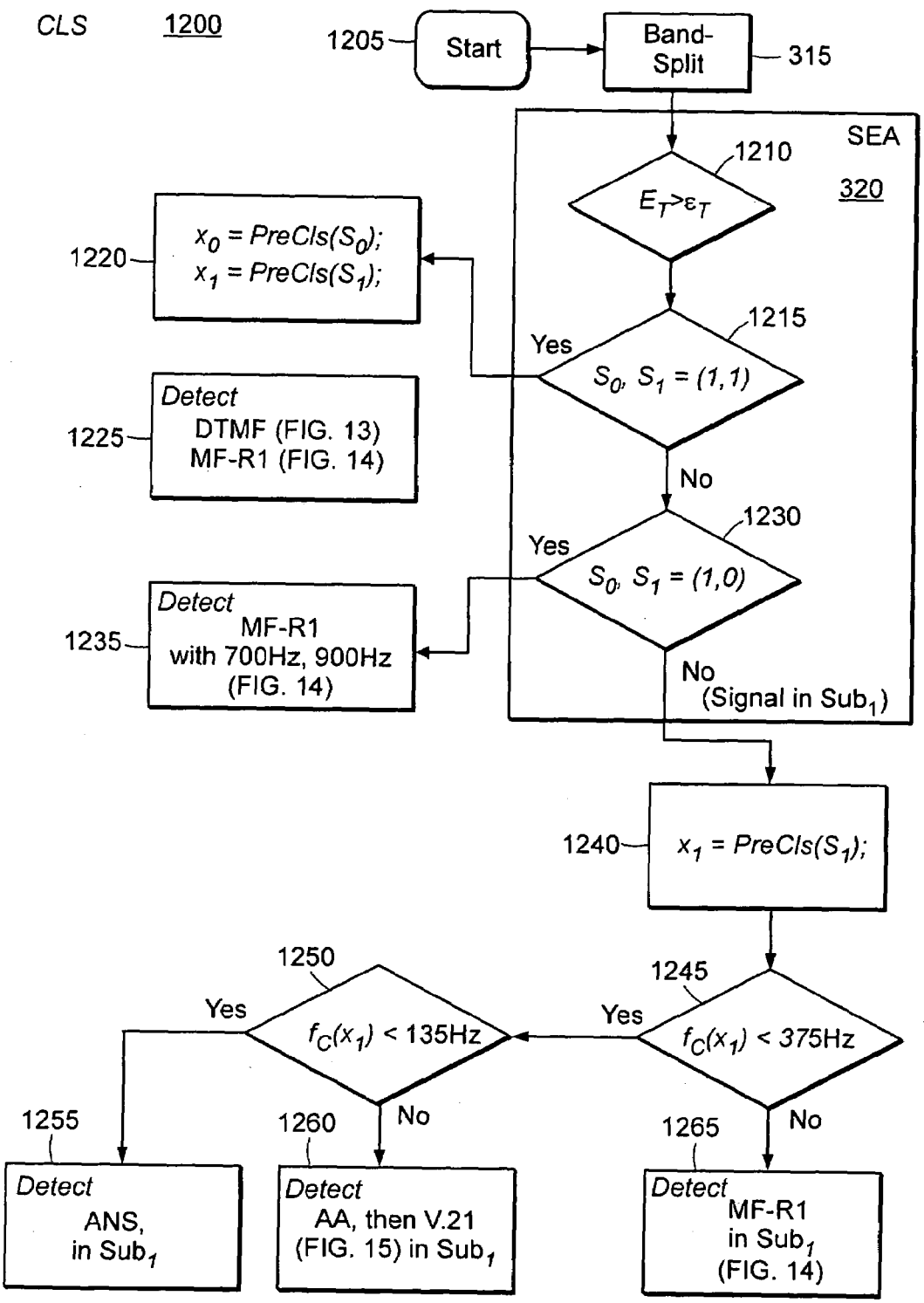
FIG. 12 is a flow diagram of an embodiment of the process of the classifier of FIG. 7.

Equipped with all the above a priori knowledge, the classifier 215 uses a main control process, whose flowchart is given in FIG. 12.

Individual Detectors

FIG. 12 is a flow diagram of an embodiment of the main control process 1200 executed by the high density signal classifier, CLS 215.

The main control process 1200 begins in step 1205. In the next step, the band-split unit 315 separates the received signal into two subband signals, $S_0$ and $S_1$, as described above. Following the band-split unit 315, the signal energy assessment unit (SEA) 320 processes the subband signals.

Figure 13:
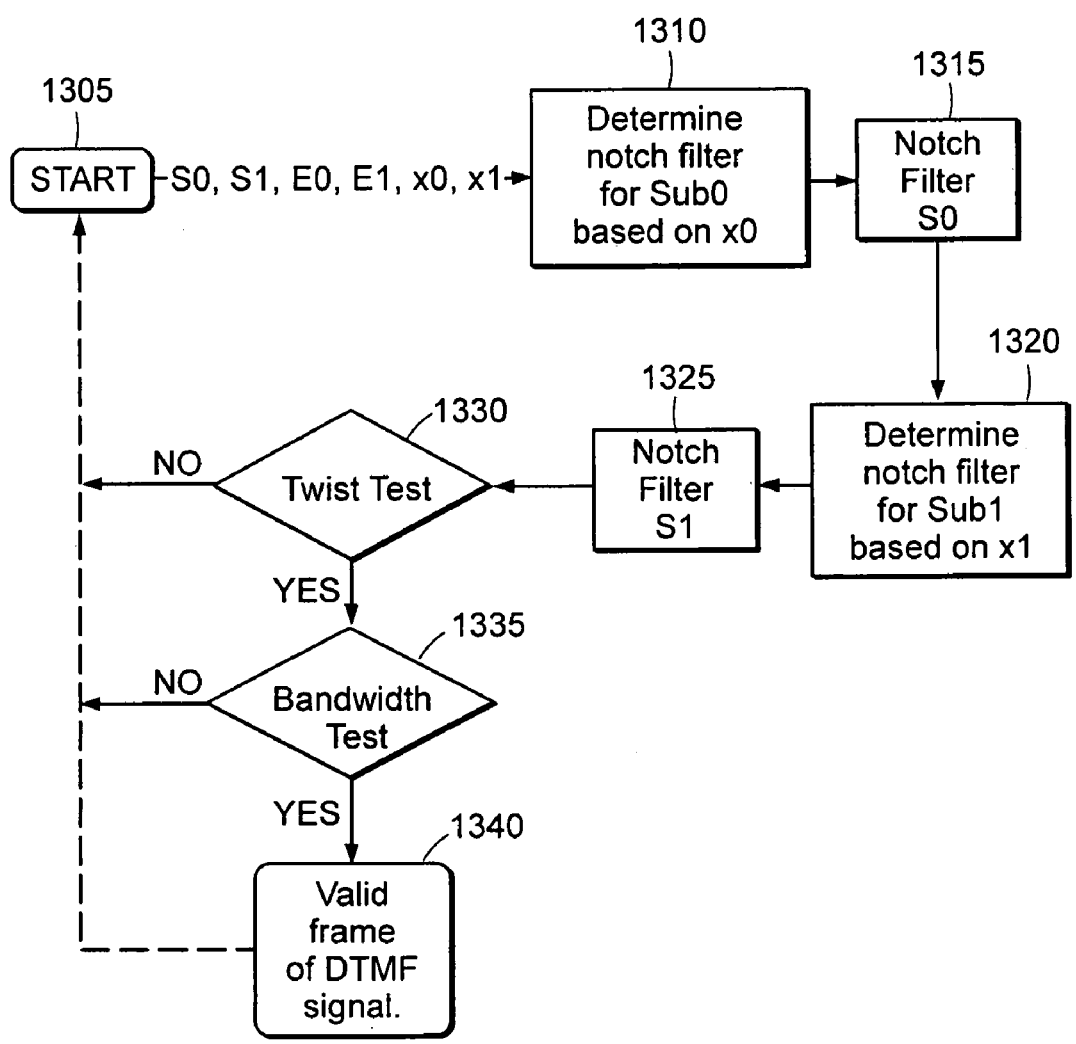
FIG. 13 is a flow diagram of an embodiment of DTMF detection logic used by the process of FIG. 12.
Figure 14:
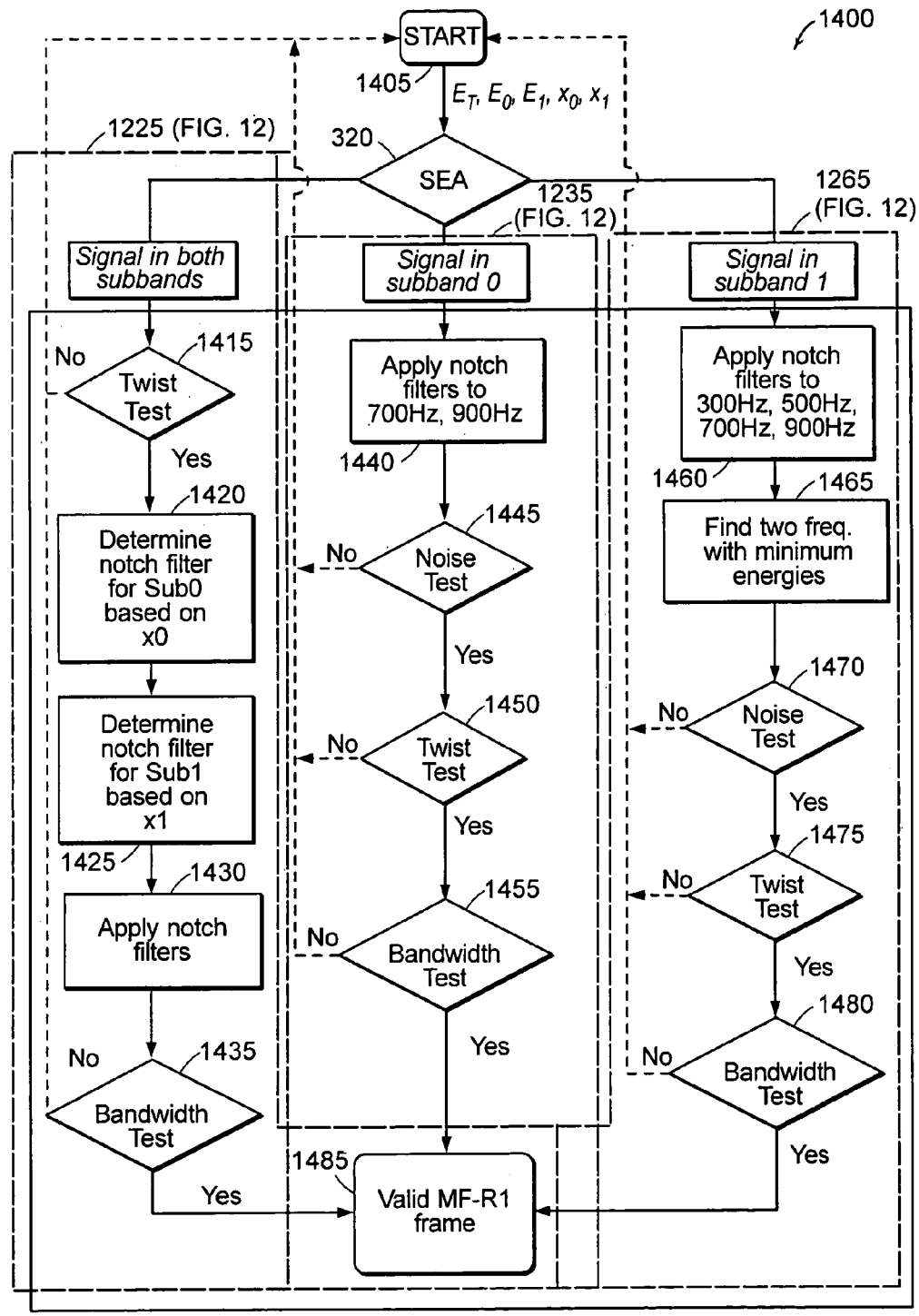
FIG. 14 is a flow diagram of an embodiment of MF-R1 detection logic used by the process of FIG. 12.

In step 1210 in the SEA 320, the process 1200 makes a comparison between the total energy ($E_T = E_0 + E_1$) of the signal and a pre-determined threshold, $\epsilon_T$, as described above in reference to equation (4). If the total energy, $E_T$, of the received signal is greater than the energy threshold, $\epsilon_T$, then processing continues in step 1215. Step 1215 determines if there is energy in both subbands. If there is energy in both subbands, then the signal is determined to be either a DTMF signal or MF-R1 signal and processing continues in step 1220. In step 1220, the values of the variables $x_0$ and $x_1$ are determined by the Preclassifiers 705a, 705b (FIG. 7) and Table 4. Next, in step 1225, a DTMF/MF-R1 detector uses the values of $x_0$ and $x_1$, along with $S_0$, $S_1$, $E_0$, $E_1$ to determine whether the received signal is DTMF or MF-R1. DTMF detector portion of step 1225 is depicted in FIG. 13; the MF-R1 portion of step 1225 is depicted in FIG. 14.

Continuing to refer to FIG. 12, if the total energy of the received signal is less than the energy threshold, $\epsilon_T$, then processing continues in step 1230. In step 1230, if the received signal is determined to have energy only in Subband 0 but not Subband 1, then the received signal can only be an MF-R1 signal with 700 Hz or 900 Hz, and processing continues in step 1235, shown in detail in FIG. 14.

Continuing to refer to FIG. 12, if step 1230 determines the received signal has energy only in Subband 1, then the signal may be ANS, AA, V.21, or MF-R1 in Subband 1. In this case, processing continues in step 1240, where the value of variable $x_1$ is determined by the preclassifier 705b (FIG. 7) and Table 4. If the corresponding, precalculated frequency, $f_c(x_1)$, is less than 375 Hz (step 1245), then processing continues in step 1250; otherwise, the MF-R1 detector (FIG. 14) is executed in step 1265.

If $f_c(x_1)$ is less than 135 Hz (step 1250), then an ANS detector is executed in step 1255, as described in detail later. If $f_c(x_1)$ is greater than 135 Hz, then an AA detector is executed in step 1260, also described later (in reference to FIG. 15).

There are same similarities with DTMF and MF-R1 detection techniques in some recent designs described in co-pending U.S. patent application Ser. No. 09/696,730 filed Oct. 25, 2000 by Tanrikulu et at, entitled "Method and Apparatus for Performing High Density DTMF, MF-R1, MF-R2 Detection", incorporated herein by reference in its entirety. The designs in Tanrikulu et al do not focus on the preclassitier 705, and, also, the designs are isolated implementations of DTMTF and MF-R1 detection. Therefore, in the DTMF case, previous designs were mainly directed to utilizing eight notch filters, instead of the two notch filters and preclassifier 705 as in the present invention. Similarly, the previous MF-R1 detector designs utilize six notch filters, whereas the current implementation of the signal classifier uses only two notch filters and a preclassifier in Subband 1, if required.

DTMF Detection

As mentioned above, this DTMF detector of the present invention uses a structure, as in FIG. 7, rather than the structure in FIG. 6. It turns out that since the implementation of a preclassifier 705 consumes fewer instruction cycles than the implementation of three notch filters, the design in FIG. 7 is more efficient in computational complexity. Furthermore, the design of the present invention is more memory efficient, since memory is reserved for each of the eight notch filters in FIG. 6, but stores only two notch filter histories. The preclassifier 705, and the modification of FIG. 6 to FIG. 7 with fewer instruction cycles and less memory, are distinguishing aspects of the present invention.

The DTMF detection logic 715 of the DTMF detector in FIG. 7 has similarities to what is described in co-pending U.S. patent application Ser. No. 09/696,730 filed Oct. 25, 2000 by Tantikulu et al., entitled "Method and Apparatus for Performing High Density DTMF, MF-R1, MF-R2 Detection", incorporated herein by reference in its entirety, but it also has new aspects to do with the presence of the preclassifier 705. The flowchart of FIG. 13 describes the DTMF detection logic 715 in the present invention classifier 215 (FIG. 2). Note that the order of the steps in this flowchart can be altered without significantly changing the operation of the DTMF detector. Further note that So, $S_1$, $E_0$, $E_1$, $x_0$, $x_1$ are inputs to the DTMF detector.

Continuing to refer to FIG. 13, the DTMF detector logic 715 begins in step 1305. In step 1310, the process determines a first notch filter based on $x_0$. In step 1315, the first notch filter is applied to the Subband 0 signal, $S_0$. In step 1320, the process determines a second notch filter based on $x_1$. In step 1325, the second notch filter is applied to the Subband 1 signal, $S_1$. The notch-filtered signals, $S_0$ and $S_1$, are analyzed by a twist test 1330 and a bandwidth test 1335.

The Twist-Test (TT) 1330 is used to determine whether $$\varepsilon_L \stackrel{?}{<} \frac{E_0}{E_1} \stackrel{?}{<} \varepsilon_H \qquad (11)$$

is satisfied in accordance with the international standards, which means that the energies of the row and column frequencies of a DTMF signal are within certain levels of each other.

The Bandwidth-Test (BT) 1335 makes sure that if the frequency deviations on the tones are within 1.5% of the nominal frequency, they are declared as valid; and, if the frequency deviations are outside of the 3.5% of the nominal frequency, they are declared as invalid. This is accomplished by checking the input-output energy ratio of the notch filters used. In other words, if the output energy for the p-th notch filter in the q-th subband is $E_{p,q}$, and the notch filters i and j are selected by the preclassifiers 705, then the BT 1335 is $$\frac{E_0}{E_{0,i}} \stackrel{?}{>} \delta_0 \quad \text{and} \quad \frac{E_1}{E_{1,j}} \stackrel{?}{>} \delta_1 \qquad (12)$$

Note that in FIG. 13, if the TT 1330 and BT 1335 are passed, then the current frame of data is declared as a valid DTMF frame (step 1340). However, these frame-based decisions are monitored over time to declare valid DTMF digits. Such decisions have to do with the minimum duration and short periods of signal drop-outs encountered in DTMF signals.

MF-R1 Detection

Referring now to FIG. 14, the MF-R1 detector is called (steps 1225, 1235, 1265) in three different ways in the flow diagram of FIG. 12 depending upon how the SEA 320 labels the signal presence in subbands. Three conditions exist, and these are described below.

Referring to FIG. 14, if the signal energy assessment (SEA) unit 320 determines there is signal in both subbands (step 1215, FIG. 12), the MF-R1 detector is called (step 1225), and a TT 1415 is performed to make sure that the difference between signal levels in the two subbands are as in equation (11) with different ($\epsilon'_L$, $\epsilon'_H$) values, specific to MF-R1 detection. Then, the preclassifier results, which are already available (i.e., predetermined), are used with the decision regions in Table 6 to select one notch filter per subband (steps 1420, 1425). These notch filters are then used (step 1430) to validate the presence of a valid MF-R1 signal in a given frame of data through a bandwidth test 1435, which is again a ratio of the output energy to the input energy. Note that the thresholds ($\delta_0$, $\delta_1$) are again different than in equation (12). If the bandwidth test 1435 is met, then a valid MF-R1 frame is reported in step 1485.

Continuing to refer to FIG. 14, in the second case, the SEA 320 labels the current frame as having energy only in Subband 0 (step 1230, FIG. 12), and processing continues in step 1235. From Table 6, it is known that there are only two candidate frequencies, 700 Hz and 900 Hz, in this case. In this case, notch filters are applied (step 1440) and a Noise-Test (NT) 1445 is performed to reject noisy signals, where the noise test involves $$\frac{E_{0,(700\,\text{Hz})} + E_{0,(900\,\text{Hz})}}{E_0} \stackrel{?}{<} \gamma_0 \qquad (13)$$

This test makes sure that the energies are concentrated around 700 Hz and 900 Hz only. After the NT 1445, a TT 1450 is performed to rule out if a single tone is present only. This is again of the form $$\varepsilon''_L \stackrel{?}{<} \frac{E_{0,(700\,\text{Hz})}}{E_{0,(900\,\text{Hz})}} \stackrel{?}{<} \varepsilon''_H \qquad (14)$$

Finally, a BT test 1455 is performed which is of the form $$\frac{E_0}{E_{0,(700\,\text{Hz})}} \stackrel{?}{>} \delta''_0 \quad \text{and} \quad \frac{E_0}{E_{0,(900\,\text{Hz})}} \stackrel{?}{>} \delta''_1 \qquad (15)$$

If the BT test 1455 is met, then a valid MF-R1 frame is reported in step 1485. Continuing to refer to FIG. 14, as the third condition, the SEA 320 labels the current frame as having signal energy only in Subband 1 (step 1230, FIG. 12), and processing continues in step 1265. In this case, the possibilities are 300 Hz, 500 Hz, 700 Hz, and 900 Hz according to Table 6. The detection procedure (steps 1240, 1245, 1265, FIG. 12) is as follows. First, four notch filters are instantiated (step 1460) and the output energies are obtained. Then, the two frequencies that have the lowest output energy (step 1465) are labeled as $E_{1,i}$ and $E_{1,j}$. Then, the tests in the second case above are repeated (steps 1470, 1475, 1480) at these frequencies using $E_{1,i}$, and $E_{1,j}$ and also $E_1$. If the tests 1470, 1475, and 1480 are met, then a valid MF-R1 frame is reported in step 1485.

AA Detection

The signal AA is an 1800 Hz tone that maps into 200 Hz in $\text{Sub}_1$ according to Table 3. AA detection is activated if the SEA 320 determines there is signal only in $\text{Sub}_1$ (steps 1240, 1245, 1250, 1260, FIG. 12), if the preclassifier return value indicates a candidate tone with a frequency between 135 Hz and 375 Hz. If these conditions are satisfied, a notch filter at 200 Hz (not shown) is used to filter the signal in $\text{Sub}_1$, and a BT test (not shown) is performed that checks to see if $$\frac{E_1}{E_{1,(200\,\text{Hz})}} \stackrel{?}{>} \delta_{AA} \qquad (16)$$

V.21 Detection

If the AA detector returns with a FALSE decision, then a V.21 detector is initiated (step 1260). Referring to the V.21 detector 1500 of FIG. 15, the V.21 signal is a binary FSK signal with frequencies at 1650 Hz and 1850 Hz. At the 2 KHz sampling rate of the classifier 215 structure, these frequencies map into 350 Hz and 150 Hz respectively. The baud rate of V.21 is 300 bits/sec. In the VoIP application where the classifier 215 is used, the objective of the V.21 detector is to detect FAX calls over the system and switch the system into the appropriate mode. Note that, in a FAX call, the V.21 signal will always start with the repeating bit sequence of . . .00111111 . . . Implementing a full FSK demodulator is computationally too expensive, since 300 bits/sec corresponds to each bit being represented by 2000/3000=6.67 samples/bit. Therefore, an interpolation filter is needed. However, note that the objective is just to detect . . . 00111111 . . . , not to demodulate any arbitrary V.21 signal. Therefore, an approximate non-coherent demodulator can be used, where it is assumed that samples/bit=7, as indicated in a delay 1505 of FIG. 15.

Figure 15:
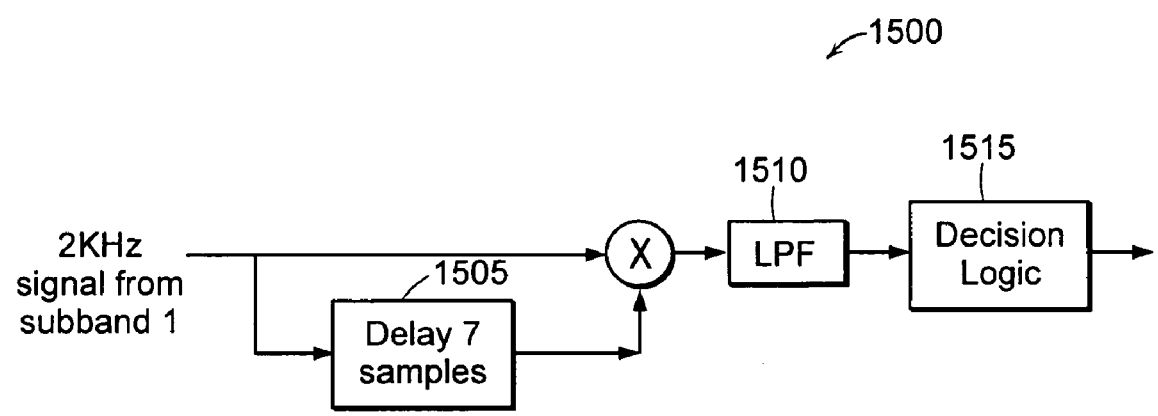
FIG. 15 is a block diagram of a V.21 detector executing in the process of FIG. 12.

Continuing to refer to FIG. 15, a LPF 1510 is a single-pole IIR filter with the transfer function $$LPF = \frac{1-\alpha}{1-\alpha z^{-1}}, \alpha = 0 < \alpha < 1 \qquad (17)$$

Figure 16:
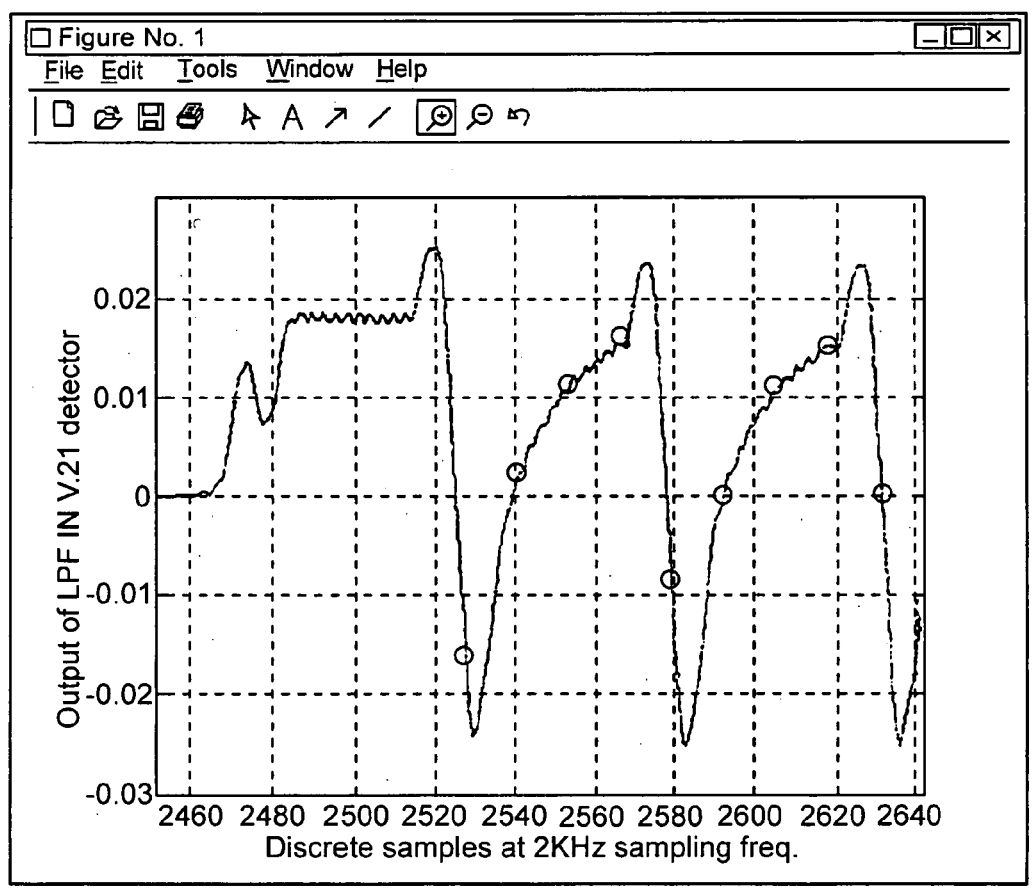
FIG. 16 is a plot of the output from the low pass filter (LPF) of the V.21 detector of FIG. 15.

A typical output of the LPF 1510 is shown in FIG. 16. Note that the decision logic 1515 first looks for 16 positive values to locate the beginning of a meaningful signal. This corresponds to the initial pile of positive numbers before the first zero-crossing in FIG. 16. Then, once the positive values are detected, then the first zero-crossing is located as the first transition from positive to negative. After the zero-crossing, a countdown is initiated from 3 to zero to get the first bit. Then, since the ratio of samples/bit is not an integer, countdowns from 13 to zero are used to get the other bits. This essentially corresponds to detecting a decimated version of the bit sequence . . . 00111111 . . . as . . . 0111 . . . After each detection of 0111, the detector is reset to detect the next zero-crossing again. As long as . . . 01110 . . . are detected, it is determined that a V.21 signal is present. Note that, due to samples/bit being a fractional number, the structure in FIG. 15 will occasionally miss the bit pattern . . . 01110 . . . , but since only the detection of the beginning of a V.21 is required, the above structure should be sufficient. Note that, some FAX machines signal the sequence . . . 01111110 . . . The above described mechanism is sufficient to detect again . . . 0111 . . . on this sequence.

ANS Tone and Phase Reversal Detection

The ANS tone is a tone commonly used in data modems. The classifier 215 (FIG. 2) detects this 2100 Hz tone (steps 1215, 1230, 1240, 1245, 1250, FIG. 12), which maps into $Sub_1$ at 100 Hz. The detection of this tone is through a notch filter at 100 Hz (not shown), and a BT test (not shown) is performed for this purpose that checks to see if $$\frac{E_1}{E_{1,(100 Hz)}} \overset{?}{>} \delta_{ANS} \quad (18)$$

if this is true for a particular frame that is noted in memory. In modems, such as V.34 and V.90, there are phase reversals imposed on the ANS Tone. These phase reversals essentially make the signal wide-band at the moment of phase reversal. Therefore, an ANS detector with a notch filter would fail to recognize such a frame as a valid ANS tone. The frequency-domain dispersion of the signal due to the phase reversal dissipates one 10 msec frame. Therefore, the decisions for ANS detection are made over two frames, and if the decisions are 11 or 01 or 10, a valid ANS tone is still declared. Only if the decisions are 00, the CLS 215 (FIG. 2) declares there is no ANS tone.

Figure 17:
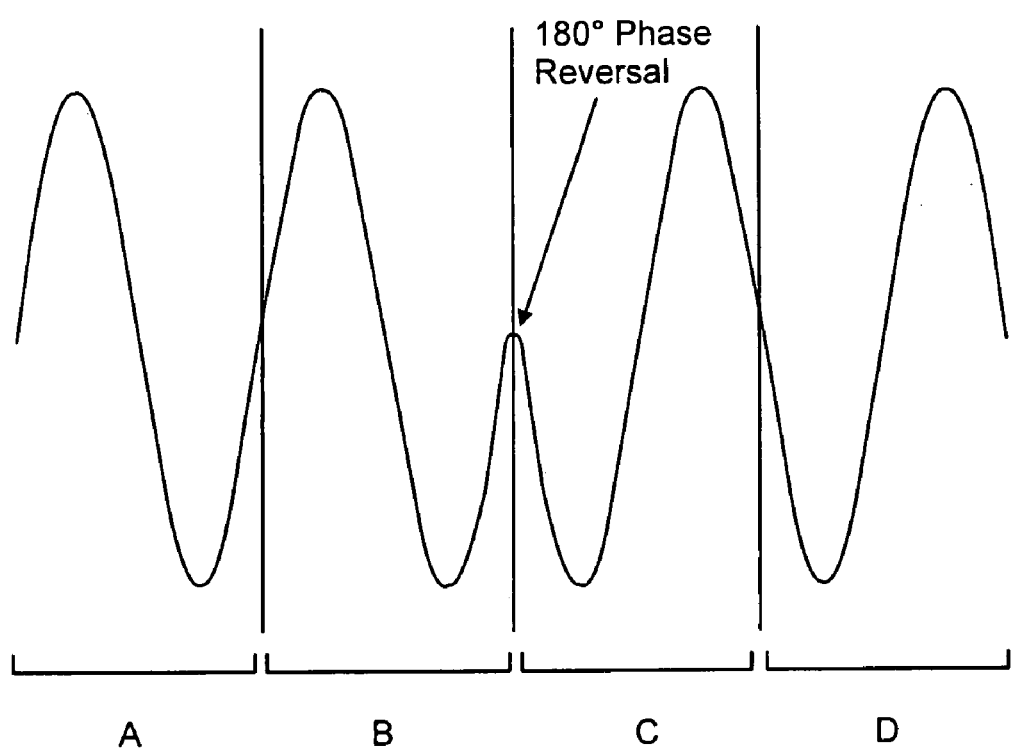
FIG. 17 is a plot of a signal having a phase reversal detected by a detector in the process of FIG. 12.
Figure 18A:
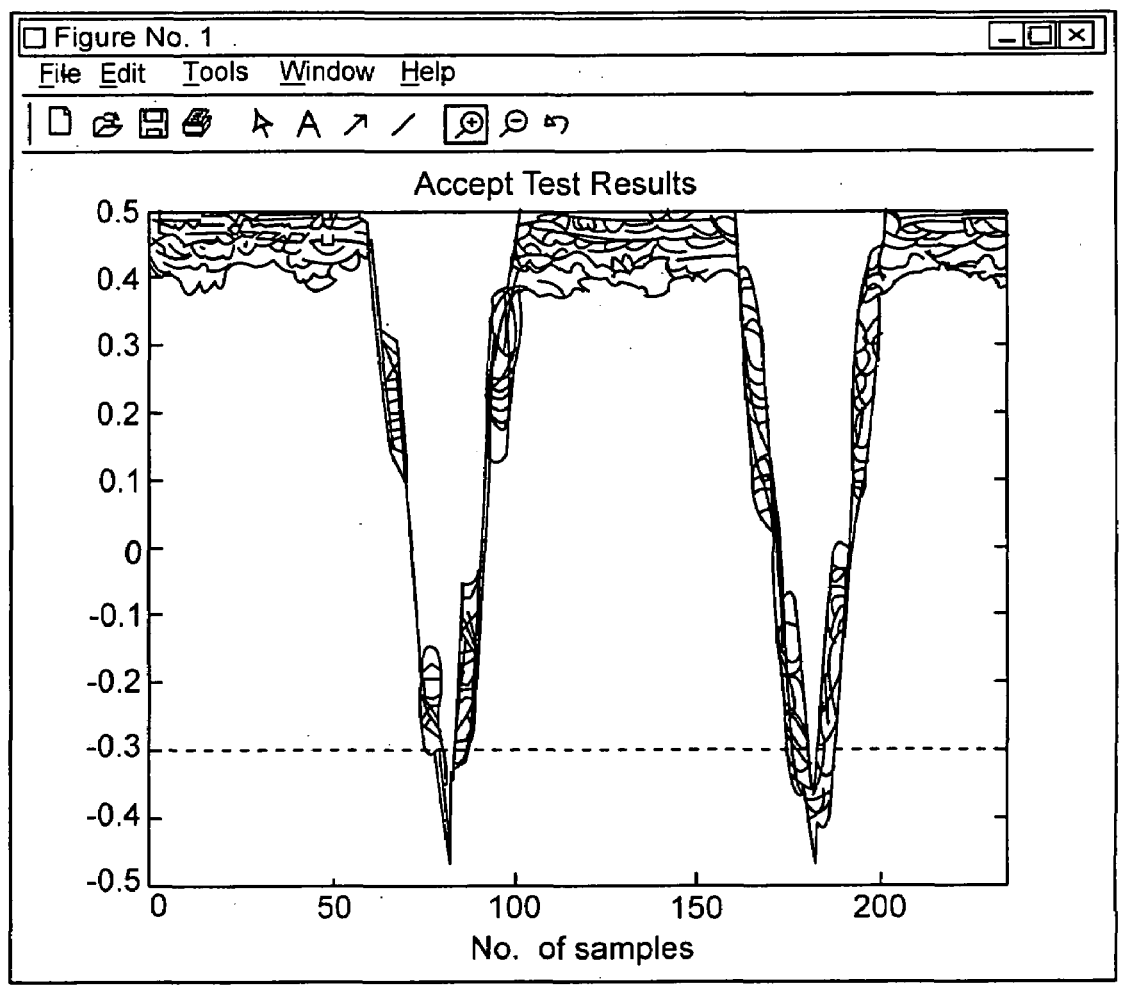
FIG. 18A is a plot of phase reversal detection identified by accepted tests by the detector in the process of FIG. 12.
Figure 18B:
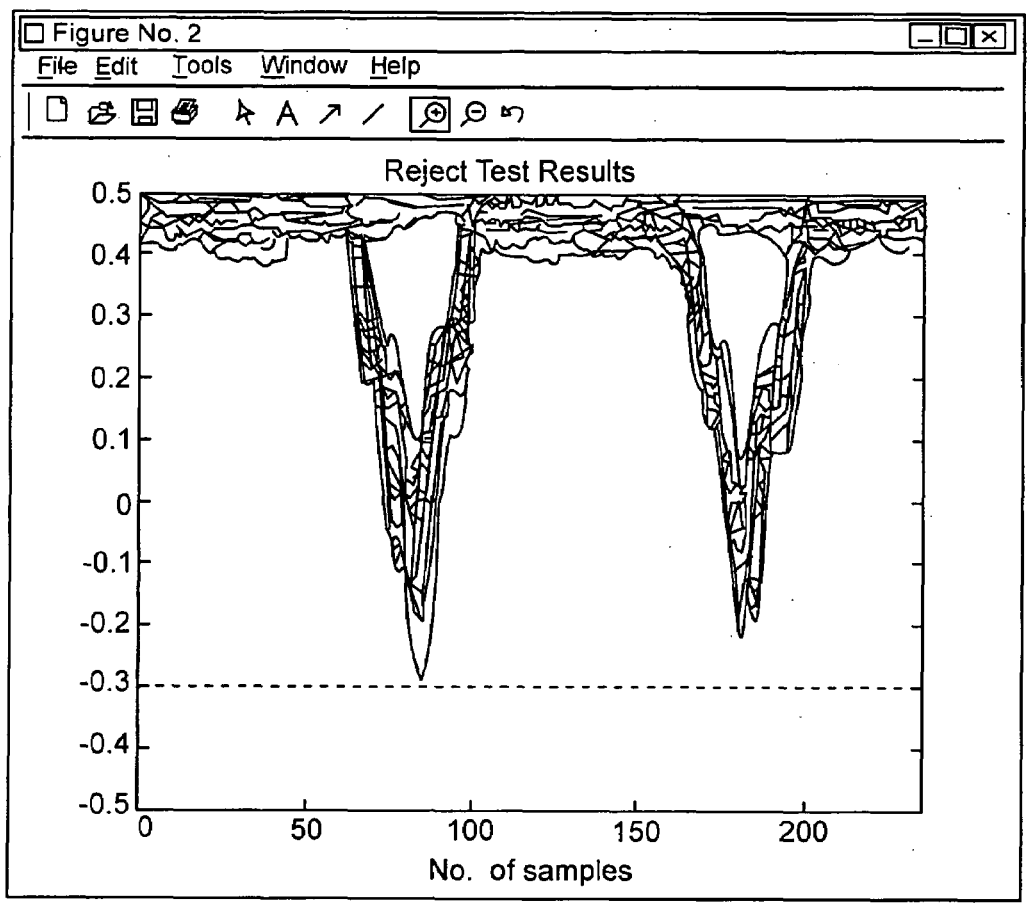
FIG. 18B is a plot of a phase reversal detection identified by rejected tests by the detector in the process of FIG. 12.

The detection of the phase reversal is de-coupled from the detection of the ANS tone, but existence of phase reversals are checked only if a valid ANS tone has been detected. The detection of the phase reversal is based on computing a normalized crosscorrelation coefficient between successive periods of a 2100 Hz tone. As noted above, 2100 Hz maps into 100 Hz in $Sub_1$, where the sampling frequency is 2 KHz. So, a single period of this signal is 20 samples, or 10 msec. This happens to coincide with the frame size that is used in the subband classifier 215 (FIG. 2). The advantage is that one period of the 2100 Hz tone exactly fits into one frame of data in $Sub_1$. The basis of the detection of phase reversals is illustrated in FIG. 17

The normalized cross-correlation coefficient over two consecutive frames of data—frame X and frame Y—for signal s(n) is $$r_{X,Y} = \frac{1}{\sigma^2} \sum_{i=n}^{n+N-1} \frac{s(i)s(i-N)}{X \quad Y} \text{ where} \quad (19)$$

$$\sigma^2 = \sum_{i=n-N}^{2N-1} s^2(i) \quad (20)$$

is the energy computed over the two frames of data, X and Y. From equations (19), (20), and in FIG. 17, if X=A, Y=B, then $r_{X,Y}=0.5$. Similarly, if X=B, Y=C, then $r_{X,Y}=-0.5$. Finally, beyond the phase reversal, if X=C, Y=D, then $r_{X,Y}=0.5$ again. Therefore $r_{X,Y}$ will dip negative during a phase reversal and the following condition is used to detect it $$r_{X,Y} < -\alpha \quad (21)$$

The minimum negative value will depend upon the amount of phase reversal in degrees. Another feature of this detector is that it is non-coherent, meaning, if the ANS tone has some frequency shift, the phase reversal detector is not affected by it. Finally, since the original 8 KHZ signal is put into subbands, if the original signal has wide-band noise superimposed, the band-splitting operation rejects the noise in the lower half of the spectrum, which increases the Signal-to-Noise Ration (SNR) by 3 dB. Note that, for each phase reversal, $r_{X,Y}$ stays negative for a number of samples. Therefore, a lockout time of 20 msec is used to make sure that the same phase reversal is not detected twice.

A number of plots are given below that illustrate the variation of $r_{X,Y}$ under different conditions. These conditions exercise various phase reversal amounts and SNRs.

Extended tests have been performed, where 250 phase reversals are introduced for different amounts of phase reversals. The results are presented in Tables 7 and 8. In the first test in Table 7, all phase reversals are detected, whereas in Table 8, none of the phase reversals qualify as valid for detection, and therefore must be rejected.

TABLE 7

Accept Test Results.

| % Error | SNR | | | | | |
|---|---|---|---|---|---|---|
| Phs. Rev. | 15 | 13 | 11 | 9 | 7 | 5 |
| 180° | %0.0 | %0.0 | %0.0 | %0.0 | %0.0 | %0.0 |
| 165° | %0.0 | %0.0 | %0.0 | %0.0 | %0.0 | %0.0 |
| −165° | %0.0 | %0.0 | %0.0 | %0.0 | %0.0 | %0.0 |
| 155° | %0.0 | %0.0 | %0.0 | %0.0 | %0.0 | %0.4 |
| −155° | %0.0 | %0.0 | %0.0 | %0.0 | %0.0 | %1.6 |

TABLE 8

Reject Test Results.

| % Error | SNR | | | | | |
|---|---|---|---|---|---|---|
| Phs. Rev. | 15 | 13 | 11 | 9 | 7 | 5 |
| 180° | %0.0 | %0.0 | %0.0 | %0.0 | %0.0 | %0.0 |
| 165° | %0.0 | %0.0 | %0.0 | %0.0 | %0.0 | %0.0 |
| −165° | %0.0 | %0.0 | %0.0 | %0.0 | %0.0 | %0.0 |
| 155° | %0.0 | %0.0 | %0.0 | %0.0 | %0.0 | %0.4 |
| −155° | %0.0 | %0.0 | %0.0 | %0.0 | %0.0 | %0.0 |

Note that, the detection of the phase reversals is accurate even at 5 dB SNR. However, it should be noted that the above results were obtained with a MATLAB® equivalent of the phase reversal detection algorithm. In the real (i.e., non-simulated) classifier 215, the detection performance worsens below 11 dB SNR. This is because, for such low SNR values, the SEA 320 in the classifier 215 decides there is signal in both subbands, but the existence of phase reversals or the 2100 Hz tone are not checked under that condition. This is due to keeping the complexity to a minimum. If detection below 11 dB SNR is required, the ANS tone and phase reversal detections must be called if SEA 320 decides there is signal in both subbands. Note that, in this case, the preclassifier decisions may be used to differentiate between DTMF/MF-R1 and ANS tone situations. This is an open issue for further exploration.

Algorithmic Complexity and MIPS Estimates

Table 9 is a table of the processes that are called covering all the possibilities described in FIGS. 12–17 above.

TABLE 9

Algorithmic Complexity.

| E0 >= E0_thrshld | E1 >= E1_thrshld | Blockwise Complexity |
|---|---|---|
| TRUE | TRUE | HPF + BS + $PC_0$ + $PC_1$ + 2N (DTMF) + 2N(MF-R1) |
| TRUE | FALSE | HPF + BS + 2N (MF-R1, 700 Hz, 900 Hz) |
| FALSE | TRUE | HPF + BS + $PC_1$ + 4N (MF-R1) – ($PC_1$ > 375 Hz) Or HPF + BS + $PC_1$ + N(ANS) – (135 Hz < $PC_1$ < 375 Hz) Or HPF + BS + $PC_1$ + N(AA) + 2N (V.21) – ($PC_1$ < 135 Hz) | where

BS: is the band-split, $PC_{0,1}$: is the preclassifier running on subband 0 and subband 1, N: is a notch filter.

As indicated by Table 9, the overall algorithmic complexity is gated by the first case. Therefore, the complexity of the classifier 215 is HPF+BS+2PC+4N. Note that the HPF 310 is running at 4 KHz sampling frequency.

The following description provides estimates of some MIPS numbers for DTMF detection by the classifier 215. Based on a recent design an efficient DTMF detector. The complexity for DTMF is BS+2PC+2N. Note that the affect of frame sizes on cycle counts is ignored in lieu of those measured during testing of the efficient DTMF detector; namely, for 10 msec, 6 cycles/sample for notch, and 8 cycles/sample for the band-splitter 315. It is also assumed that there are 20 cycles of overhead associated with band splitting and notch filtering operations (setup+epilogue+prologue).

Preclassifying is approximately (1divs+3*20 cycles ($r_0$, $r_1$, $r_2$)+20 cycles(windowing)+3 cycles(alpha filtering on $r_0$, $r_1$, $r_2$)+12 cycles (add, mul, sub))=125 cycles per 10 msec frame—assuming 30 cycles for a division. Therefore, the total is (8*2000+2*6*2000+125*100)=52500 cycles/sec. By the same calculation method, the DTMF detector implemented as in FIG. 6 is BS+8N=112000 cycles/sec. Note that the effect of the high-pass filter 310 (FIG. 3) is ignored. The high pass filter 310 which would make the difference less but not by a large factor. Therefore, the classifier 215 equipped with the preclassifier 705 is a more efficient embodiment than using a notch filter 605a, 605b (FIG. 6) for every frequency of interest.

As a first reference point for the reduction in complexity of the classifier 215 employing the principles of the present invention, in a recent implementation, the classifier 215 executed on a Texas Instruments® TMS320C54x DSP with 0.7 MIPS, whereas a traditional classifier would execute in 7 MIPS or more on the same DSP. As a second reference point, in another recent implementation, the classifier 215 executed on a TMS320C6xDSP in 0.3 MIPS, whereas a traditional classifier would execute in 3 MIPS or more on the same DSP. The complexity typically translates proportionally to the number of instructions and instruction cycles. It should be understood that the MIPS (i.e., execution speed) is dictated, in part, by the compiler used to compile the classifier software, the architecture of the processor, the pipelining efficiency of the processor, the clock speed, and other typical variables affecting the computational efficiency of the DSP or other processor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for classifying a communication signal, comprising:

decomposing a subject signal into subbands;

determining a presence of energy in the subbands corresponding to at least one sinusoid in the subject signal; and classifying the subject signal as having a given communication protocol from among multiple communication protocols based on the presence of energy in the subbands; and instantiating a given validation detector from among a selected group of validation detectors, the given validation detector being associated with the given communication protocol of the classified subject signal to validate the subject signal.

2. The method according to claim 1, wherein decomposing the subject signal into subbands includes PS-IIR filtering.

3. The method according to claim 1, further including engaging a preclassifier to estimate a frequency of a given sinusoid.

4. The method according to claim 3, wherein estimating the frequency of the given sinusoid includes modeling the given sinusoid.

5. The method according to claim 4, wherein modeling the sinusoid includes solving a second-order, auto-regression equation.

6. The method according to claim 3, wherein estimating the frequency of the given sinusoid includes accessing a look-up table having pre-determined ranges of data corresponding to the frequency of the given sinusoid.

7. The method according to claim 6, wherein the ranges of data are adjusted to account for estimation error due to finite signal length.

8. The method according to claim 3, further including windowing the subband prior to estimating the frequency of the given sinusoid.

9. The method according to claim 8, wherein windowing includes employing an N-point triangular window.

10. The method according to claim 1, wherein classifying results in classifying the signal as one of the following signal types: DTMF, MF-R1, ANS(V.25), LEC_DIS, V.21, or AA.

11. The method according to claim 1, wherein determining a presence of energy in the subbands includes narrowing classification possibilities as a function of the presence, or absence, of energy in the subbands.

12. The method according to claim 11, further including notch filtering at select frequencies estimated to be sinusoid frequencies in the signal to further narrow classification possibilities.

13. The method according to claim 1, wherein decomposing the subject signal significantly reduces the bandwidth of the subbands compared to the subject signal.

14. The method according to claim 1, further including processing the subject signal in predetermined frame sizes.

15. The method according to claim 14, wherein the frame sizes are 10 msec in length.

16. The method according to claim 1, further including reporting the subject signal signal-type after three consecutive classification identifying the same signal-type.

17. The method according to claim 1, wherein classifying results in discriminating facsimile, modem, voice, and DTMF signals.

18. The method according to claim 1, wherein executing the method uses an order of magnitude fewer processor instruction cycles than traditional methods for classifying communication signals.

19. The method according to claim 1, wherein the method uses less than about 0.5 MIPS.

20. The method according to claim 1, wherein plural such methods are operating on a single digital processor.

21. The method according to claim 1, used in a media gateway.

22. An apparatus for classifying a communication signal, comprising:
   a band decomposing a subject signal into subband signals;
   an energy detector coupled to the band-splitter to determine a presence of energy in the subband signals corresponding to at least one sinusoid in the subject signal; and
   a validation detector director coupled to said energy detector to classify the subject signal as having a given communication protocol from among multiple communication protocols, based on the presence of energy in the subbands; and
   at least one given validation detector, from among a selected group of validation detectors, said at least one given validation detector being associated with the given communication protocol of the classified subject signal to validate the subject signal, instantiated by the validation detector director as a function of the classified subject signal, said at least one given validation detector being coupled to the energy detector to validate the subject signal.

23. The apparatus according to claim 22, wherein the band-splitter includes at least one PS-IIR filter.

24. The apparatus according to claim 22, further including a preclassifier to estimate a frequency of a given sinusoid.

25. The apparatus according to claim 24, wherein the preclassifier users an automated modeling technique to determine the frequency of the given sinusoid.

26. The apparatus according to claim 25, wherein the automated modeling technique solves a second-order, autoregression equation.

27. The apparatus according to claim 24, wherein the preclassifier accesses a look-up table having pre-determined ranges of data corresponding to the frequency of the given sinusoid.

28. The apparatus according to claim 27, wherein the ranges of data are adjusted to account for estimation error due to finite signal length.

29. The apparatus according to claim 24, wherein the preclassifier uses a window to filter the subband signal prior to estimating the frequency of the given sinusoid.

30. The apparatus according to claim 29, wherein the window is an N-Point triangular window.

31. The apparatus according to claim 22, wherein the signal is classified as one of the following signal types: DTMF, MF-R1, ANS (V.25), LEC_DIS, V.21, or AA.

32. The apparatus according to claim 22, wherein the energy detector narrows classification possibilities as a function of the presence, or absence, of energy in the subband signals.

33. The apparatus according to claim 32, wherein the validation detector director instantiates notch filters at select frequencies estimated to be sinusoid frequencies in the subject signal to further narrow classification possibilities.

34. The apparatus according to claim 22, wherein the subband signals are significantly reduced in band-width compared to the subject signal.

35. The apparatus according to claim 22, further including a frame-size control unit to control frame sizes of the signal being processed to be in predetermined frame sizes.

36. The apparatus according to claim 35, wherein the frame sizes are 10 msec in length.

37. The apparatus according to claim 22, further including a reporting unit that reports the subject signal signal-type after three consecutive classifications identifying the same signal-type.

38. The apparatus according to claim 22, discriminating facsimile, modem, voice, and DTMF signals. uses an order of magnitude fewer processor instruction cycles than traditional methods for classifying communication signals.

39. The apparatus according to claim 22, wherein executing the method uses an order of magnitude fewer processor instruction cycles than traditional methods for classifying communication signals.

40. The apparatus according to claim 39, wherein classifying the signal uses less than about 0.5 MIPS.

41. The apparatus according to claim 22, wherein said band-splitter, said energy detector, and said validation detector director are incorporated on a single digital processor.

42. The apparatus according to claim 22, wherein the apparatus is used in a media gateway.

43. The apparatus for classifying a communication signal, comprising:
   means for decomposing the signal into subbands;
   means for determining a presence of energy in the subbands corresponding to at least one sinusoid in the decomposed signal; and
   means for classifying the subject signal as having a given communication protocol from among multiple communication protocols based on the presence of energy in the subbands; and
   means for instantiating a given validation detector from among a selected group of validation detectors, the given validation detector being associated with the given communication protocol of the classified subject signal to validate the signal.

44. A computer-readable medium having stored thereon sequences of instructions, the sequences of instructions including instructions, when executed by a digital processor, causes the processor to perform:
   decomposing a subject signal into subbands;
   determining a presence of energy in the subbands corresponding to at least one sinusoid in the subject signal;
   classifying the subject signal as having a given communication protocol from among multiple communication protocols based on the presence of energy in the subbands; and
   instantiating a given validation detector from among a selected group of validation detectors, the given validation detector being associated with the given communication protocol of the classified subject signal to validate the subject signal.

45. An apparatus comprising:
a receiver for receiving at least one analog signal having a protocol from among plural communication protocols;
an analog-to-digital converter to convert said at least one analog signal to a corresponding digital signal; and
a digital processor coupled to an output of the analog-to-digital converter to receive the digital signal, the digital signal processor executing program instructions to:
decompose the digital signal into subbands;
determine a presence of energy in the subbands corresponding to at least one sinusoid in the decomposed digital signal;
classifying the received analog signal as having a given communication protocol from among multiple communication protocols based on the presence of energy in the subbands; and
instantiating a given validation detector from among a selected group of validation detectors, the given validation detector being associated with the given communication protocol of the classified analog signal to validate the analog signal.

46. An apparatus, comprising:
means for receiving at least one analog signal having a given communication protocol from among plural communication protocols;
means for converting said at least one analog signal to a corresponding digital signal; and
means for processing the digital signal, including:
means for decomposing the digital signal into subbands;
means for determining a presence of energy in the subbands corresponding to at least one sinusoid in the decomposed digital signal;
means for classifying the received analog signal as having a given communication protocol based on the presence of energy in the subbands; and
means for instantiating a given validation detector from among a selected group of validation detectors, the given validation detector being associated with the given communication protocol of the classified analog signal to validate the received analog signal.

47. The apparatus according to claim 46, wherein the apparatus is a gateway coupled to a network.

48. An apparatus comprising:
means for receiving at least one signal having a given communication protocol from among plural communication protocols;
means for decomposing the received signal into subbands;
means for classifying the received signal as having a given communication protocol based on the signals in the subbands; and
means for instantiating a given validation detector from among a selected group of validation detectors, the given validation detector being associated with the given communication protocol of the classified received signal to validate the received signal.

49. A central office, comprising:
a first interface coupled to a first link to a digital network;
a second interface coupled to a second link to at least one subscriber terminal in the digital network; and
a classifier coupled to said first and second interfaces, said classifier being employed to:
decompose a subject signal into subbands;
determine a presence of energy in the subbands corresponding to at least one sinusoid in the decomposed signal;
classifying the subject signal as having a given communication protocol from among multiple communication protocols based on the presence of energy in the subbands; and
instantiate a given validation detector from among a selected group of validation detectors, the given validation detector being associated with the given communication protocol of the classified analog signal to validate the subject signal.

50. A method for classifying a communication signal, comprising:
reducing an input signal into two lower-bandwith signals;
detecting the presence of at least one sinusoid in the lower-bandwidth signals;
and based on the presence of said at least one sinusoid in the lower-bandwidth signals, instantiating a given validation detector from among a selected group of validation detectors, the given validation detector being associated with the given communication a protocol of the classified sinusoid to validate said at least one detected sinusoid is of a frequency corresponding to a frequency indicative of one of plural communication protocols.

51. The method according to claim 50, wherein reducing the input signal into two lower-bandwidth signals includes:
sampling the communication signal with and A/D converter; and
filtering the sampled signal with at least one PS-IIR filter.

52. The method according to claim 50, wherein detecting the presence of at least one sinusoid includes:
measuring energies in the lower-bandwidth signals; and
comparing the energies to expected energy levels.

53. The method according to claim 50, wherein validating said at least one detected sinusoid includes:
filtering said at least one sinusoid with at least one corresponding filter; and
for each filter, comparing the output of the filter to the input of the filter to test(i) the energy level and frequency of individual sinusoids, and, if applicable, (ii) the difference in magnitude of the energy levels of the two sinusoids composing the indications of a communication protocol employed by the communication signal.

54. The method according to claim 50, further including determining the signal to be a facsimile, modem, voice, or DTMF signal.

* * * * *

UNITED STATES PATENT AND TRADEMARK OFFICE
CERTIFICATE OF CORRECTION

PATENT NO. : 7,020,272 B2
APPLICATION NO. : 09/812057
DATED : March 28, 2006
INVENTOR(S) : Oguz Tanrikulu It is certified that error appears in the above-identified patent and that said Letters Patent is hereby corrected as shown below:

column 23, line 27: replace "band" with -- band-splitter-- .

column 23, line 40: before "instantiated" insert
-- the at least one given validation detector -- .

column 24, lines 25-27: delete -- uses an order of magnitude fewer processor instruction cycles than traditional methods for classifying communications signals.-- column 25, line 17: replace "classifying" with -- classify -- .

column 25, line 21: replace "instantiating" with -- instantiate --.

column 26, line 19: replace "analog" with -- subject -- .

Signed and Sealed this

Twenty-second Day of August, 2006

JON W. DUDAS
*Director of the United States Patent and Trademark Office*